US012775823B2

(12) United States Patent
Wang et al.

(10) Patent No.: US 12,775,823 B2
(45) Date of Patent: Oct. 27, 2026

(54) SYSTEMS AND METHODS FOR GENERATION OF MACHINE-LEARNED MULTITASK MODELS

(71) Applicant: Google LLC, Mountain View, CA (US)

(72) Inventors: Qifei Wang, Sunnyvale, CA (US); Junjie Ke, East Palo Alto, CA (US); Grace Chu, Santa Clara, CA (US); Gabriel Mintzer Bender, Mountain View, CA (US); Luciano Sbaiz, Gattikon (CH); Feng Yang, Sunnyvale, CA (US); Andrew Gerald Howard, Culver City, CA (US); Alec Michael Go, Milpitas, CA (US); Jeffrey M. Gilbert, Los Altos, CA (US); Peyman Milanfar, Menlo Park, CA (US); Joshua William Charles Greaves, Provo, UT (US)

(73) Assignee: GOOGLE LLC, Mountain View, CA (US)

( * ) Notice: Subject to any disclaimer, the term of this patent is extended or adjusted under 35 U.S.C. 154(b) by 822 days.

(21) Appl. No.: 18/014,314

(22) PCT Filed: Jul. 23, 2020

(86) PCT No.: PCT/US2020/043285
§ 371 (c)(1),
(2) Date: Jan. 3, 2023

(87) PCT Pub. No.: WO2022/019913
PCT Pub. Date: Jan. 27, 2022

(65) Prior Publication Data

US 2023/0267307 A1 Aug. 24, 2023

(51) Int. Cl.
*G06N 3/045* (2023.01)
*G06N 3/084* (2023.01)
*G06N 3/092* (2023.01)

(52) U.S. Cl.
CPC ............. *G06N 3/045* (2023.01); *G06N 3/084* (2013.01); *G06N 3/092* (2023.01)

(58) Field of Classification Search
CPC ......... G06N 3/045; G06N 3/092; G06N 3/084
See application file for complete search history.

(56) References Cited

U.S. PATENT DOCUMENTS

2019/0354868 A1 11/2019 Wierstra et al.
2020/0125955 A1 4/2020 Klinger et al.

OTHER PUBLICATIONS

Guo, Pengsheng, Chen-Yu Lee, and Daniel Ulbricht. "Learning to Branch for Multi-Task Learning." arXiv preprint arXiv: 2006. 01895v2 (2020). (Year: 2020).*

(Continued)

*Primary Examiner* — Markus A. Vasquez
(74) *Attorney, Agent, or Firm* — DORITY & MANNING P.A.

(57) ABSTRACT

Systems and methods of the present disclosure are directed to a method for generating a machine-learned multitask model configured to perform tasks. The method can include obtaining a machine-learned multitask search model comprising candidate nodes. The method can include obtaining tasks and machine-learned task controller models associated with the tasks. As an example, for a task, the method can include using the task controller model to route a subset of the candidate nodes in a machine-learned task submodel for the corresponding task. The method can include inputting task input data to the task submodel to obtain a task output. The method can include generating, using the task output, a feedback value based on an objective function. The method (Continued)

can include adjusting parameters of the task controller model based on the feedback value.

17 Claims, 8 Drawing Sheets

(56) References Cited

OTHER PUBLICATIONS

Yang, Ruihan, et al. "Multi-Task Reinforcement Learning with Soft Modularization." arXiv preprint arXiv:2003.13661v1 (2020). (Year: 2020).*
Wikipedia. "Stochastic gradient descent". Article version from Sep. 21, 2019. https://en.wikipedia.org/w/index.php?title=Stochastic_gradient_descent&oldid=917001173. (Year: 2019).*
Rosenbaum, Clemens, Tim Klinger, and Matthew Riemer. "Routing networks: Adaptive selection of non-linear functions for multi-task learning." arXiv preprint arXiv:1711.01239 (2017). (Year: 2017).*
Machine Translated Chinese Search Report Corresponding to Application No. 2020801045770 on Feb. 26, 2025.
Sener et al., "Multi-Task Learning as Multi-Objective Optimization", arXiv:1810.04650v2, Jan. 11, 2019, 15 pages.
Ahn et al. "Deep Elastic Networks with Model Selection for Multi-Task Learning", 2019 IEEE/CVF International Conference on Computer Vision, IEEE, Oct. 27, 2019, 10 pages.
Guo et al. "Learning to Branch for Multi-Task Learning", arXiv:2006.01895v2, Jun. 2, 2020, 12 pages.
International Search Report for Application No. PCT/US2020/043285, mailed on.
Masse et al. "Alleviating Catastrophic Forgetting Using Context-Dependent Gating and Synaptic Stabilization", Cornell University Library, arXiv:1802.01569v2, Feb. 3, 2018, 20 pages.
Yang et al. "Multi-Task Reinforcement Learning with Soft Modularization", Cornell University Library, Mar. 30, 2020, 10 pages.
International Preliminary Report on Patentability for Application No. PCT/US2020/043285, mailed Feb. 2, 2023, 11 pages.

* cited by examiner

SYSTEMS AND METHODS FOR GENERATION OF MACHINE-LEARNED MULTITASK MODELS

PRIORITY CLAIM

This application is based upon and claims the right of priority under 35 U.S.C. § 371 to International Application No. PCT/US2020/043285 filed on Jul. 23, 2020, which is incorporated by reference herein.

FIELD

The present disclosure relates generally to joint and/or shared machine-learned models for multiple tasks. More particularly, the present disclosure relates to machine-learned multitask search model(s) for multitask model generation via neural architecture search.

BACKGROUND

Task-specific machine learning models have achieved significant success in many technical fields (e.g., computer vision, object detection, statistical prediction, etc.). These models are developed for individual tasks, and as such, are generally unable to be used effectively for multiple tasks or other tasks that differ from the specific individual task for which they were trained. However, contemporary applications of these model(s) (e.g. smart cameras on a mobile device, etc.) usually require or benefit from the performance of multiple machine learning tasks (e.g., image classification, object detection, instance segmentation, etc.).

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for generating a machine-learned multitask model configured to perform a plurality of tasks. The method can include obtaining a machine-learned multitask search model comprising a plurality of candidate nodes. The method can include obtaining the plurality of tasks and one or more machine-learned task controller models associated with the plurality of tasks. The method can include, for each task of the plurality of tasks, using the machine-learned task controller model respectively associated with the task to generate a routing that specifies a subset of the plurality of candidate nodes of the machine-learned multitask search model for inclusion in a machine-learned task submodel for the corresponding task. The method can include, for each task of the plurality of tasks, inputting task input data associated with the task to the corresponding machine-learned task submodel to obtain a task output. The method can include, for each task of the plurality of tasks, generating, using the task output, a feedback value based on an objective function. The method can include, for each task of the plurality of tasks, adjusting one or more parameters of the respectively associated machine-learned task controller model based at least in part on the feedback value.

Another example aspect of the present disclosure is directed to a computing system. The computing system can include a machine-learned multitask model configured to generate a plurality of outputs for a respectively associated plurality of tasks, wherein the machine-learned multitask model comprises a plurality of nodes, wherein each node of the plurality of nodes is included in the machine-learned multitask model based at least in part on their inclusion in one or more of a plurality of machine-learned task submodels respectively associated with the plurality of tasks. The computing system can include one or more tangible, non-transitory computer readable media storing computer-readable instructions that when executed by the one or more processors cause the one or more processors to perform operations. The operations can include obtaining first task input data associated with a first task of the plurality of tasks. The operations can include obtaining second task input data associated with a second task of the plurality of tasks, the second task being different and distinct from the first task. The operations can include inputting the first task input data to the machine-learned multitask model to obtain a first task output that corresponds to the first task. The operations can include inputting the second task input data to the machine-learned multitask model to obtain a second task output that corresponds to the second task.

Another example aspect of the present disclosure is directed to one or more tangible, non-transitory computer readable media storing computer-readable instructions that when executed by one or more processors cause the one or more processors to perform operations. The operations can include obtaining a machine-learned multitask model configured to generate a plurality of outputs for a respectively associated plurality of tasks, wherein the machine-learned multitask model comprises a plurality of nodes, wherein each node of the plurality of nodes is included in the machine-learned multitask model based at least in part on their inclusion in one or more of a plurality of machine-learned task submodels respectively associated with the plurality of tasks. The operations can include obtaining first task input data associated with a first task of the plurality of tasks. The operations can include obtaining second task input data associated with a second task of the plurality of tasks, the second task being different and distinct from the first task. The operations can include inputting the first task input data to the machine-learned multitask model to obtain a first task output that corresponds to the first task. The operations can include inputting the second task input data to the machine-learned multitask model to obtain a second task output that corresponds to the second task.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
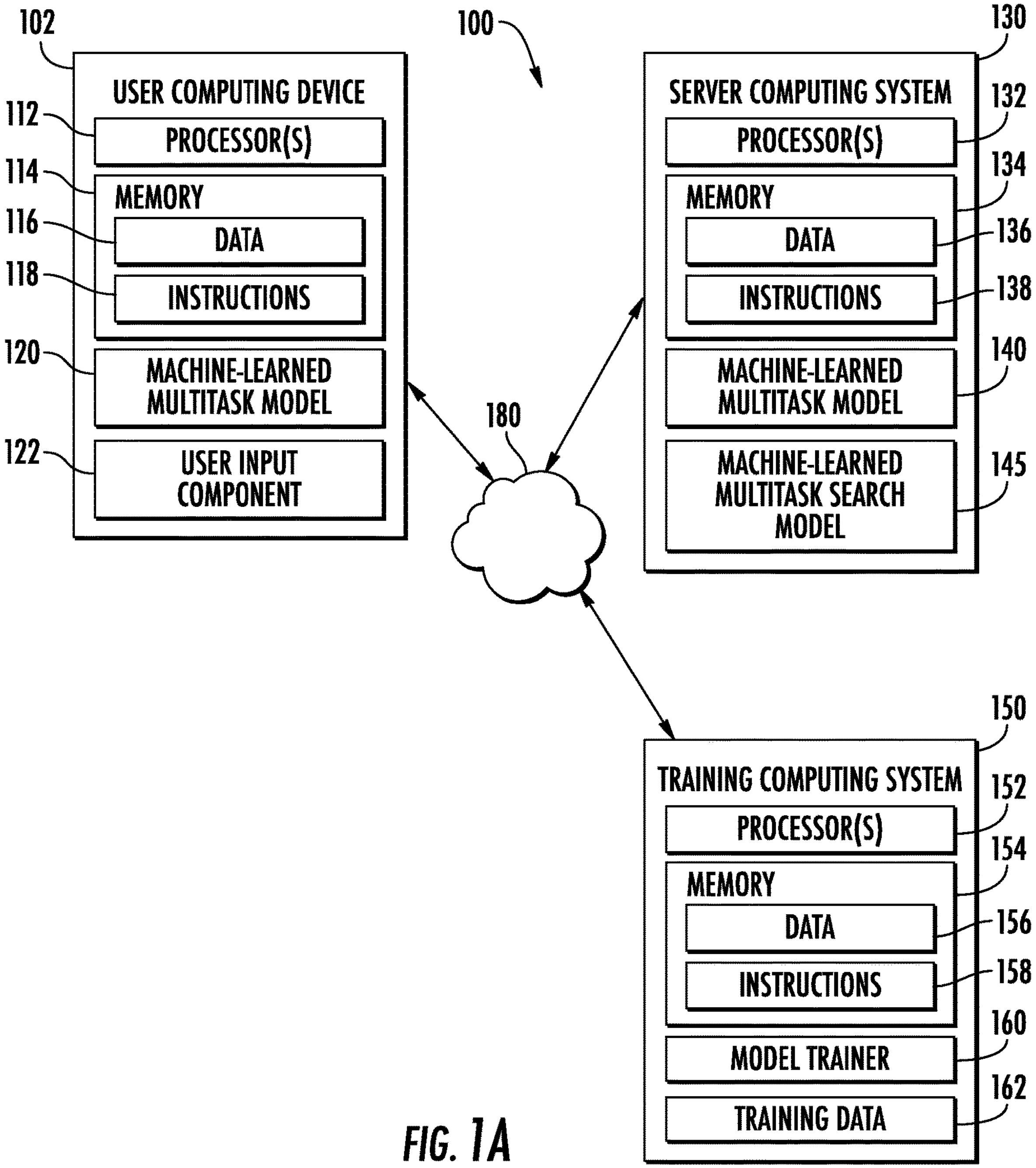
FIG. 1A depicts a block diagram of an example computing system that performs machine-learned multitask model generation according to example embodiments of the present disclosure.

Reference numerals that are repeated across plural figures are intended to identify the same features in various implementations.

DETAILED DESCRIPTION

Overview

Generally, the present disclosure is directed to a multitask learning architecture for machine-learned multitask model generation. More particularly, systems and methods of the present disclosure are directed to a machine-learned multitask search model that can be trained and used to generate a machine-learned multitask model (e.g., via neural architecture search, etc.). As an example, a machine-learned multitask search model can include a plurality of candidate nodes (e.g., each candidate node can receive a dataset and perform a respective function on the dataset defined by a set of adjustable parameters, to generate an corresponding output; each candidate node can be or include one or more neural network neuron(s), neural network function(s), convolutional filter(s), neural network layer(s), residual connection(s), neural network primitive(s), etc.). A machine-learned task controller model (e.g., a reinforcement learning agent) associated with a task can be used to generate a routing (e.g., through the machine-learned multitask search model, etc.). More particularly, the routing can specify a subset of the plurality of candidate nodes to be included in a machine-learned task submodel for the corresponding task. Task data associated with the task can be input to the machine-learned task submodel to receive a feedback value (e.g., a reward value and/or a loss value). Parameters of the machine-learned task controller model and/or the machine-learned multitask search model can be adjusted based on the feedback value. This process can be repeated for a plurality of tasks and one or more respectively associated machine-learned task controller models. In such fashion, the machine-learned task controller model(s) can be trained to generate optimal routings through the machine-learned multitask search model for their respective tasks, therefore generating for each task an optimal, task-specific variant of the machine-learned multitask model from the machine-learned multitask search model.

More particularly, the use of task-specific machine learning techniques has developed rapidly, and such techniques are now used across a variety of technical domains. However, the task-specific nature of contemporary machine-learned models necessitates the design, training, optimization, processing, and storage of a machine-learned model for each computational task. For applications that require that a large number of tasks be performed jointly (e.g., smart cameras on a mobile device, etc.), the cascading of the corresponding machine-learned models can introduce enormous latency, memory footprint, and power consumption to the device in question. Additionally, the training of such task-specific machine-learned models can suffer from a lack of curated training data for each of the tasks required for performance of the application.

Accordingly, systems and methods of the present disclosure are directed to a multitask machine-learned search architecture using a machine-learned multitask search model. More particularly, a computing system can obtain a machine-learned multitask search model that is configured to perform a plurality of tasks. The machine-learned multitask search model can include a plurality of candidate nodes. The candidate nodes can be or otherwise include one or more components of a neural network (e.g., an artificial neural network, a convolutional neural network, a recurrent neural network, etc.). As an example, a candidate node can include a plurality of neural network neurons and/or functions structured as a layer (e.g., a convolutional layer, a pooling layer, etc.). As another example, the candidate node can be or otherwise include a single neuron of a neural network. As yet another example, the candidate node can be, perform, or otherwise include one or more machine-learned model functions (e.g., a normalization function such as a softmax function, a filtering function, a pooling function, etc.). In such fashion, each candidate node can be or otherwise include any component(s), layer(s), and/or functionality(s) of a machine-learned model.

The computing system can obtain a plurality of tasks and one or more associated machine-learned task controller models. A task can be or otherwise describe an expected processing operation for a machine-learned model. More particularly, a task can describe an input data type and an expected output data type for a type of machine-learned model. As an example, a task can describe the input data as image data and the expected output data as image classification data. At least one of the tasks (and optionally all of them) may take as input data real-world data collected by a sensor (e.g. a camera, such as a still or video camera, or a microphone). For example, the input may be a sound signal collected by a microphone, and the output may be data indicating symbols which may encode a semantic meaning in the sound signal.

As another example, the task can describe the input data as image data and the expected output data as object recognition data that corresponds to one or more objects depicted in the image data. Alternatively or additionally, at least one of the tasks (and optionally all of them) may generate an image (still and/or moving) and/or data describing a sound signal. Alternatively or additionally, at least one of the tasks may generate control data for controlling an agent which operates in an environment such as a real-world environment; for example, the agent may be a robot, and the task may comprise generating control data to control the robot to move (translationally and/or by changing its configuration) in a real-world environment; in another example, the agent may be system for allotting resources or work between one or more controlled systems in an environment, such as a real-world environment (e.g. for allotting different items of computational work to be performed between a plurality of computational units). As yet another example, the task can describe the input data as statistical data and the output as predictive data. As yet another example, the task can describe the input data as an encoding and the output data as a decoding or reconstruction of the encoding. As such, the plurality of tasks can include any tasks that are performed by task-specific machine-learned models. As an example, the tasks may include statistical prediction tasks, object recognition tasks, image classification tasks, semantic understanding tasks, or any other tasks.

For each of the plurality of tasks, the machine-learned task controller model that is associated with the task can be used to generate a routing (e.g., a routing "through" the machine-learned multitask search model, etc.). The routing can specify a subset of the plurality of candidate nodes to be included in a machine-learned task submodel that corresponds to the task. As an example, a machine-learned first task controller model can generate a routing for a first task. The routing can specify that a first node, a second node and a third node of the machine-learned multitask search model be included in a machine-learned first task submodel. A machine-learned second task controller model can generate a routing for a second task. The routing for the second task can specify the first node, a fourth node, and the third node of the machine-learned multitask search model be included in a machine-learned second task submodel. In such fashion, the plurality of machine-learned task controller models respectively associated with the plurality of tasks can generate a task routing for each of the tasks.

As described previously, one or more machine-learned task controller models can be obtained for the plurality of tasks. As such, a machine-learned task controller model can, in some implementations, be trained to generate an optimal routing for a single task of the plurality of tasks. As an example, 15 separate tasks and 15 respectively associated machine-learned task controller models can be obtained by the computing system. Each of the 15 machine-learned task controller models can be configured to generate routings for a respectively associated task. Alternatively, in some implementations, a machine-learned task controller model can be obtained that is configured to generate routings for multiple tasks. As an example, a first machine-learned task controller model can be obtained that can be used to generate routings for a first task (e.g., an image classification task, etc.), a second task (e.g., an image classification task, etc.), and a third task (e.g., an object recognition task, etc.). Alternatively, or additionally, in some implementations, each of the machine-learned task controller models respectively associated with the plurality of tasks can be included in a machine-learned task controller model (e.g., as discrete submodels of a main machine-learned task controller model, etc.).

In some implementations, each of the one or more machine-learned task controller model(s) can be configured to generate routing(s) for tasks that are similar in nature (e.g., share a common input and/or output data type, etc.). As an example, a plurality of machine-learned task controller models can be obtained. A first machine-learned task controller model of the plurality can be configured to generate routings for a plurality of tasks that take image data as an input (e.g., object detection task(s), image classification task(s), image semantic understanding task(s), instance segmentation task(s), etc.). A second machine-learned task controller model of the plurality can be configured to generate routings for a plurality of tasks that take statistical data as an input (e.g., trend analysis task(s), prediction task(s), etc.). In such fashion, the machine-learned task controller model(s) can be associated to task(s) based on one or more aspects of the task(s) (e.g., a input data type, an output data type, a complexity, a resource cost, a role in an associated task (e.g., a first and second task being steps in an overarching task, etc.), a learned association, etc.).

It should be noted that, in some implementations, each of the machine-learned task controller model(s) can be trained simultaneously during a "search phase" phase. In this search phase, each of the machine-learned task sub-models can define (e.g., search for, etc.) a routing through the nodes of the machine-learned multi-task search model using the respective machine-learned task controller. This allows for optimization (e.g., evaluation, collation, normalization, etc.) of all the outputs (e.g., using an adaptive loss function, etc.) of the machine-learned task submodels generated using the machine-learned task controller models during a subsequent "training phase". The training of the machine-learned task controller models will be discussed in greater detail with regards to the figures.

Each of the machine-learned task controller models can be or can otherwise include one or more neural networks (e.g., deep neural networks) or the like. Neural networks (e.g., deep neural networks) can be feed-forward neural networks, convolutional neural networks, and/or various other types of neural networks.

For each of the plurality of tasks, the computing system can input the task input data associated with the respective task into the corresponding machine-learned task submodel. The corresponding machine-learned task submodel (e.g., the selected candidate nodes of the machine-learned multitask search model, etc.) can process the task input data to obtain a task output. As described previously, the task output can correspond to the operations described by each task. As an example, if the task describes and/or includes image data and an object recognition task, the task output can be or otherwise include object recognition data. Based on an objective function, the computing system can use the task output to generate a feedback value. The objective function can be any type or form of loss function or objective function for training a machine-learned model. Similarly, the feedback value can be any type or form of loss value or feedback value (e.g., training signal, etc.) for training a machine-learned model. As an example, the objective function may be a reinforcement learning reward function, and the feedback value can include or otherwise be a reward value (e.g., a reinforcement value, etc.) configured to facilitate a policy update to the machine-learned task controller model. Alternatively, the feedback value can be a loss signal back propagated through the machine-learned multitask search model to the machine-learned task controller model(s). As such, any conventional loss or objective function can be used to evaluate the task output generated with the routing generated by the machine-learned task controller model.

In some implementations, the task input data can be validation data associated with the task of the machine-learned task controller model, and the reward value (e.g., the feedback value) can be a validation accuracy associated with the validation data. As an example, the objective function can be a reinforcement learning reward function (e.g., a REINFORCE algorithm, etc.). The task input data can be validation data associated with the task, and the feedback value can be a reward value (e.g., reinforcement value, etc.) generated based on the task output data.

The computing system can adjust one or more parameters of the respectively associated machine-learned task controller model based at least in part on the feedback value. More particularly, values of the parameters of the machine-learned task controller model can be modified based on the feedback value. The parameter(s) of the machine-learned task controller model can be adjusted using any conventional learning techniques or algorithms (e.g., backpropagation, gradient descent, reinforcement learning, etc.). As an example, the feedback value can be a value generated by backpropagation of the objective function through the machine-learned multitask search model to reach the machine-learned task controller model. The one or more parameters of the machine-learned task controller model can be adjusted based on this back propagated feedback value using any gradient descent technique (e.g., stochastic gradient descent, etc.).

As another example, the feedback value can be a reward value generated using a reinforcement learning reward function. The one or more parameters of the machine-learned task controller model can be adjusted using reinforcement learning techniques. For example, the parameter(s) of the machine-learned task controller model can be adjusted based on any one or more of an evaluation of the reward value, a reinforcement baseline, a rate factor, a learning rate, a characteristic weight eligibility, etc. As such, any implementation of reinforcement learning and/or conventional machine-learning techniques can be used to both generate the feedback value and to adjust the one or more parameters of the machine-learned task controller model.

In some implementations, training data associated with the task can also be input to the machine-learned task submodel. The training data can be any type of training data associated with the task. As an example, the training data can include image data for an object recognition task and a ground truth that describes each object depicted in the image data. The computing system can use the machine-learned task submodel to process the training data and obtain a training output (e.g., an output described by the task). The computing system can use a task loss function to generate a loss value based on the training output. The task loss function, and loss value can each be generated using any conventional machine learning techniques. As an example, the task loss function can evaluate a difference between the training output and a ground truth associated with the training data to generate the loss value.

In some implementations, after generating a loss value for each task of the plurality of tasks, the computing system can adjust one or more parameters of candidate node(s) of the machine-learned multitask search model based on the plurality of loss values for the tasks. More particularly, the parameter(s) of the candidate node(s) can be updated iteratively for each of the plurality of loss values. As an example, the loss values can be stored in the order they were generated, and the computing system can sequentially backpropagate each of the losses through the machine-learned multitask search model. Alongside backpropagation of each loss, the computing system can adjust parameter(s) of the candidate node(s) using parameter adjustment techniques (e.g., gradient descent, stochastic gradient descent, etc.). It should be noted that as the candidate node(s) can be or otherwise include component(s) of conventional neural network(s), conventional machine-learning training techniques can be used to update the candidate node(s) and/or the components of the candidate node(s) based on the loss values.

More specifically, the machine-learned multitask search model can be used to search for optimal machine-learned task submodels (e.g., routes through the machine-learned multitask search model) over a number of iterations. Formally, the machine-learned multitask search model can utilize N tasks $T=\{T_1, T_2, \ldots, T_N\}$. In the "search" phase, the machine-learned multitask search model can utilize N machine-learned task controller models, $C=\{C_1, C_2, \ldots, C_N\}$, to manage the route selection for each task (e.g., to generate the machine-learned task submodels for each task, etc.).

Within one iteration, each of the machine-learned task controller models $C_i$ can respectively sample one route for each task $T_i$. Each sampled route can form a sampled machine-learned task submodel for task $T_i$ and each $C_i$ can receive a feedback value (e.g., a reward value, etc.) $\mathcal{R}_i$ (e.g., a validation accuracy, etc.) from the model prediction. This $\mathcal{R}_i$ can then be used to adjust parameters of the machine-learned task controller model $C_i$ (e.g., perform policy gradient update(s), etc.). The sampled machine-learned task submodels can then be trained on one batch of training data.

It should be noted that in some implementations, the machine-learned multitask search model can be utilized over a number of iterations to iteratively update the parameters of the machine-learned task controller models and/or the parameters of the machine-learned multitask search model itself, to effectively "search" for optimal machine-learned task submodels (e.g., routes) for each task. At a next iteration, each machine-learned task controller $C_i$ can generate a new machine-learned task submodel (e.g., resample an updated route with an updated policy, etc.). These iterations can be repeated until a maximum number of iteration epochs has been reached. As such, the workflow described above can, in some implementations, be described more formally as:

```
Result: Multiple Architecture Routes
  Initialize machine-learned task controller models (RL-Controllers);
  Initialize machine-learned multitask search model (super-network from search space);
  while Epochs<MaxEpochs do
    while i<TaskCount do
      Sample one route for Task [i] to form machine-learned task submodel;
      Run submodel on validation set to get Reward [i] (feedback value);
      Run model on training set to get TrainLoss [i] (loss value);
    end
    Perform update (REINFORCE) on machine-learned task controller models with Reward [i];
    Backprop TrainLoss [ ] to update model params in machine-learned multitask search model;
  end
```

However, it should be noted that the formalized representation described above is depicted merely to illustrate a single example of the present disclosure, and as such, the structure and/or process depicted is not necessarily required. More particularly, the operations described above can be performed in any alternative order or sequence. As an example, the operations described as the "Perform update (REINFORCE) on machine-learned task controller models with Reward [i]" step can, in some implementations, be performed iteratively in the "while" loop that iterates through each task of the plurality of tasks.

Alternatively, in some implementations, the plurality of loss values can be optimized through use of an optimizer. An optimizer can be a function (e.g., loss function, optimization function, objective function, etc.), configured to adaptively adjust the parameter(s) of the candidate node(s) of the machine-learned multitask search model based on the respective magnitudes of the plurality of loss values. As an example, the optimizer can be an adaptive loss function that adjusts parameters adaptively based on the difficulty of a task. For example, a first task can be considered "harder" than a second task if the first task has a greater associated loss value. The adaptive loss function can weigh the loss value associated with the first task more heavily than the loss value associated with the second task when adjusting the parameter(s) of the candidate node(s). As such, the loss values can, in some implementations, be "weighted" based at least in part on the magnitude of the loss value.

More particularly, the loss function can, in some implementations, be leveraged to adaptively prioritize tasks during the training phase and obtain balanced performance for all the tasks. This adaptive balanced task prioritization (ABTP) technique can introduce a transformed loss objective function as shown in equation (1) below, where θ denotes the model parameters, $\mathcal{L}(T_i;\theta)$ denotes the loss of task $T_i$ with the current model parameters (e.g., of the machine-learned multitask search model, etc.), r(θ) denotes the regularization:

$$\min_{\theta}\sum_{i=1}^{N} h(\mathcal{L}(T_i;\theta)) + r(\theta) \tag{1}$$

In multitask learning scenarios, the loss of each task can generally signal the task difficulty. The boosting function h(·) in equation (1) described above can be introduced to transform the loss subspace to a new subspace to boost the priorities of harder tasks. During gradient update, $h'(\mathcal{L}(T_i;\theta))$ can be viewed as the current weight for task $T_i$. When h(·) is monotonically increasing, tasks with larger losses will be favored. The equation (1) described above can be described as adaptive in nature, as the equation can dynamically adjust task weights during the entire training phase. More particularly, each task can respectively be assigned an associated task weight, and the objective function and/or the loss function can be configured to evaluate the task weight associated with the respective task.

If a linear function is utilized as h(·), the objective function can be regressed to a scaled sum of the task losses which generally cannot achieve desired task prioritization, as h'(·) is constant. As such, it should be noted that multiple options for the boosting function h(·) can be utilized, including but not limited to linear, polynomial, and exponential functions. As an example, some functions (e.g., polynomial functions, exponential functions, etc.) can be utilized to amplify the adjustments generated based on the loss value(s), therefore facilitating the optimizer to favor the "harder" task over the "easier" task. As another example, nonlinear boosting function(s) and/or exponential boosting function(s) can be utilized to increase model performance by facilitating operation of the optimizer. More generally, h(·) may be a function which increases faster than linearly, e.g. with h'(·) being an increasing function of the argument.

In some implementations, the joint loss function (e.g., the loss function) can be made adjustable during search and training iterations (e.g., adjustment of parameters of the machine-learned task controller model(s) and the machine-learned multitask search model) by introducing a task prioritization coefficient in the boosting function. More particularly, an exponential function can be used as a boosting function, and an adaptive boosting function (e.g., the loss function) can be defined as:

$$h = \exp\left(\frac{\mathcal{L}(T_i;\theta)}{w}\right) \tag{2}$$

As described in equation (2), the adaptive coefficient w can be put on a decay schedule throughout the training phase (e.g. linear decay from $w_{max}$ to $w_{min}$). As w decreases, tasks with larger loss can become increasingly more important. As such, the machine-learned multitask search model can favor difficult tasks more at the later parts of the search/training phase for eventual inclusion in a machine-learned multitask model. It should be noted that in some implementations, either a decreasing schedule of w, a constant schedule of w, or an increasing schedule of w. However, in some implementations, utilization of a decreasing schedule of w can lead to more efficient performance with the machine-learned multitask search model.

Alternatively, in some implementations, the task input data can include the training data. Similarly, the task output of the machine-learned task submodel can include the training output. More particularly, the task output can be utilized as both a training output and a task output to respectively generate the loss value and the feedback value by the computing system. In such fashion, the computing system can input a single dataset to the machine-learned task submodel (e.g., a training set, a validation set, a combination of both sets, etc.) to receive an output configured to provide both a feedback value and a loss value.

In some implementations, the computing system can generate the machine-learned multitask model. More particularly, the computing system can utilize the nodes specified for inclusion in the machine-learned task controller submodels for each task to generate the machine-learned multitask model. As such, the machine-learned multitask model can include at least one subset of the plurality of subsets of candidate nodes specified for inclusion in at least one respective machine-learned task submodel. As an example, the machine-learned multitask search model can perform a number of searching iterations in accordance with a number of machine-learned task controller models. For example, three machine-learned task controller models for three respective tasks can iteratively optimize a routing (e.g., specified candidate nodes for inclusion in a machine-learned task submodel, etc.) for each of the three tasks. After the final search epoch, the computing system can utilize at least one of the three candidate node subsets (e.g., the three machine-learned task submodels, etc.) to generate the machine-learned multitask model. As an example, the computing system may select two machine-learned task submodels and their corresponding candidate node(s) for inclusion in the machine-learned multitask model. As another example, the computing system may select each of the one or more machine-learned task submodels and their respective candidate node(s) for inclusion in the machine-learned multitask model.

It should be noted that the generation of the machine-learned multitask model can also include the route specified between the candidate nodes. As an example, if a machine-learned multitask model is generated with the candidate nodes specified by a first machine-learned task submodel, the machine-learned multitask model can retain the specified route through the candidate nodes of the machine-learned task submodel, and any parameters associated with these nodes. In such fashion, the machine-learned multitask search model can be utilized alongside the machine-learned task controller model(s) to find an optimal machine-learned task submodel for each task, and the machine-learned multitask model can be generated by selecting the nodes and routes discovered through utilization of the machine-learned multitask search model.

More specifically, in some implementations, at the end of the search phase, the most "likely routes" (e.g., the optimal machine-learned task submodels) can be taken from each machine-learned task controller model(s) to form a single machine-learned multitask model (e.g., a joint model) with all task routes and specified candidate nodes. As described previously, the machine-learned task submodel for one task can be built with the nodes routed by a route generated by the machine-learned task controller model(s). As such, in the machine-learned multitask model (e.g., the joint model), each task can run through its own route as specified by its optimized machine-learned task submodel.

It should be noted that in some implementations, if more than one task is routed to the same node in the machine-learned multitask model, the weights (e.g., parameter values, etc.) in/of that shared node can be used by all tasks that share the node. If only one task is routed to a node, the node will be exclusively used by that task.

In some implementations, candidate nodes of the machine-learned multitask search model that were not used by any task (e.g., were not included in any machine-learned task submodel by the machine-learned task controller model(s)) can remain unselected for inclusion in the machine-learned multitask model. As such, the machine-learned multitask model can include a subset of the total candidate nodes that constitute the machine-learned multitask search model. In some implementations, for a node of the machine-learned multitask model (e.g., a conv node, etc.), each task can selectively use a subset of filters. The filter number can also be selected by the machine-learned task controller model for the task.

In some implementations, the machine-learned multitask model can subsequently be trained. In training, each task can train the nodes included in the tasks route. In such fashion, the sharing of nodes between task routes can reduce the number of parameters in the machine-learned multitask model. Additionally, the sharing of nodes can facilitate positive knowledge transfer among tasks. More particularly, multitask training data associated with one of the machine-learned task submodels can be input to the machine-learned multitask model to obtain a multitask training output. One or more parameters of the machine-learned multitask model can be adjusted based on the multitask training output (e.g., based on a loss function, etc.). In such fashion, additional training iterations can be utilized to further optimize the machine-learned multitask model.

As such, a node can be favored by multiple tasks when its parameters are beneficial for each of them. Given that each machine-learned task controller model can independently select the route through candidate nodes based on the feedback value (e.g., the task accuracy reward), the route similarity can also manifest more strongly when tasks are strongly correlated (e.g., image classification and object classification, etc.).

The machine-learned multitask model can be utilized to generate multiple outputs for multiple corresponding tasks. More particularly, a computing system can include the machine-learned multitask model. The machine-learned multitask model can be generated at the computing system (e.g., using the machine-learned multitask search model, etc.) or received from a second computing system (e.g., that has used the machine-learned multitask search model, etc.). The computing system can obtain first task input data associated with a first task and second task input data associated with a second task. The tasks can be any tasks performed by a task-specific machine-learned model. As an example, the tasks can respectively be an image classification task an and object recognition task. The task input data can be associated with the respective tasks. As an example, the first task input data and the second task input data can both respectively include image data. As such, in some implementations, the first task and the second task can share the same input data and output different task output data (e.g., image classification data and object recognition data, etc.). Alternatively, in some implementations, the first task input data can be statistical prediction data and the second task data can be image data. As such, the first task and second task do not necessarily need to be similar tasks.

The computing system can input the first task input data to the machine-learned multitask model to obtain a first task output that corresponds to the first task. The computing system can input the second task input data to the machine-learned multitask model to obtain a second task output that corresponds to the second task. In such fashion, the machine-learned multitask model can be trained and utilized to perform a variety of tasks, regardless of the similarity of the tasks. As an example, the computing system can input the first and second task sequentially into the machine-learned multitask model and the joint loss function can be calculated once all tasks have been trained (e.g., with the use of an optimizer, etc.).

The present disclosure provides a number of technical effects and benefits. As one example technical effect and benefit, the systems and methods of the present disclosure enable the training and generation of a more efficient and more accurate machine-learned multitask model. As an example, many modern applications require the use of machine learning for a number of tasks in resource-constrained environments (e.g., smart camera applications on mobile devices, etc.). However, training and deploying a separate task-specific model for each task can introduce enormous latency, memory footprint, and power consumption which can make the application prohibitively expensive to use. As such, the present disclosure provides methods to train and generate a machine-learned multitask model that can be utilized in the place of individualized, specific machine-learned models. By providing a machine-learned multitask model that can be used in place of a number of task-specific models, the present disclosure can drastically reduce the computational resources (e.g., instruction cycles, electricity, bandwidth, etc.) required for various applications (e.g., smart camera applications, image processing, predictive analysis, etc.).

Another technical effect and benefit of the present disclosure is a reduced need for task-specific training data to train task-specific machine-learned models. More particularly, training task-specific machine-learned models can generally require large task-specific training data sets. As such, the collection of sufficient training data for these various tasks can, in some circumstances, be prohibitively challenging and expensive. Accordingly, the machine-learned multitask model of the present disclosure allows for the sharing of knowledge among multiple tasks. By sharing this knowledge, aspects of the present disclosure drastically improve both resource constraints and data efficiency in comparison to task-specific model training, therefore significantly reducing the expenses and computational resources needed to collect and utilize task-specific training data. Further, the machine-learned multitask model can have a reduced size and lower inference cost compared to the utilization of single-task models.

With reference now to the Figures, example embodiments of the present disclosure will be discussed in further detail.

Example Devices and Systems

FIG. 1A depicts a block diagram of an example computing system 100 that performs machine-learned multitask model generation according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned multitask models 120. For example, the machine-learned multitask models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example machine-learned multitask models 120 are discussed with reference to FIGS. 2-5.

In some implementations, the one or more machine-learned multitask models 120 can be received from the server computing system 130 over network 180, stored in the user computing device memory 114, and then used or otherwise implemented by the one or more processors 112. In some implementations, the user computing device 102 can implement multiple parallel instances of a single machine-learned multitask model 120 (e.g., to perform parallel machine-learned multitasking across multiple instances of the machine-learned multitask model 12θ).

More particularly, the machine-learned multitask model 120 can be utilized to generate multiple outputs for multiple corresponding tasks. The machine-learned multitask model 120 can be generated at the user computing device 102 (e.g., using the machine-learned multitask search model 124, etc.) or received from either the server computing system 130 (e.g., using a machine-learned multitask search model, etc.) or the training computing system 150. The user computing device 102 can obtain first task input data associated with a first task and second task input data associated with a second task (e.g., via network 180, etc.). The tasks can be any tasks performed by a task-specific machine-learned model. As an example, the tasks can respectively be an image classification task an and object recognition task. The task input data can be associated with the respective tasks. As an example, the first task input data and the second task input data can both respectively include image data. As such, in some implementations, the first task and the second task can share the same input data and output different task output data (e.g., image classification data and object recognition data, etc.). Alternatively, in some implementations, the first task input data can be statistical prediction data and the second task data can be image data. As such, the first task and second task do not necessarily need to be similar tasks.

Additionally, or alternatively, one or more machine-learned multitask models 140 can be included in or otherwise stored and implemented by the server computing system 130 that communicates with the user computing device 102 according to a client-server relationship. For example, the machine-learned multitask models 140 can be implemented by the server computing system 130 as a portion of a web service (e.g., an image processing service, a statistical analysis service, etc.). Thus, one or more machine-learned multitask models 120 can be stored and implemented at the user computing device 102 and/or one or more machine-learned multitask models 140 can be stored and implemented at the server computing system 130.

Additionally, or alternatively, the server computing system 130 can include a machine-learned multitask search model 145. The machine-learned multitask search model 145 can be trained and utilized to generate the machine-learned multitask model 140. More particularly, the machine-learned multitask search model 145 can include a plurality of candidate nodes (e.g., neural network neuron(s) and/or neural network function(s), etc.). Machine-learned task controller model(s) associated with tasks performed by the machine-learned multitask model 140 can be used to generate a routing (e.g., through the machine-learned multitask search model 145, etc.) for each of the tasks. More particularly, the routing can specify a subset of the plurality of candidate nodes to be included in a machine-learned task submodel for the corresponding task. Task data associated with the task can be input to the machine-learned task submodel to receive a feedback value. Parameters of the machine-learned task controller model can be adjusted based on the feedback value. This process can be repeated by the server computing system 130 for a plurality of tasks and one or more associated machine-learned task controller models. Over a number of iterations, the machine-learned task controller models can be trained to generate optimal routings through the machine-learned multitask search model 145 for their respective tasks. These routings can then be utilized to generate the machine-learned multitask model 140 by the server computing system 130 from the machine-learned multitask search model 145.

After using the machine-learned multitask search model 145 to generate the machine-learned multitask search model 140, the server computing system 130 can, in some implementations, send (e.g., network 180, etc.) the generated machine-learned multitask model 140 to the user computing device 102 (e.g., machine-learned multitask model 120, etc.). Alternatively, or additionally, the server computing system 130 can send (e.g., via the network 180, etc.) the machine-learned multitask model 140 to the training computing system 150 for additional training.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned multitask models 140 and/or one or more machine-learned multitask search models 145. For example, the models 140/145 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 and/or 145 are discussed with reference to FIGS. 2-5.

The user computing device 102 and/or the server computing system 130 can train the models 120, 140 and/or 145 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120, 140, and/or 145 stored at the user computing device 102 and/or the server computing system 130 using various training or learning techniques, such as, for example, backwards propagation of errors and/or reinforcement learning. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned multitask models 120 and 140 based on a set of training data 162. The training data 162 can include, for example, task-specific training data for a plurality of tasks. As an example, the training data can include a number of training examples and associated ground truths for an image classification task, a number of training examples and associated ground truths for an object recognition task, and a number of training examples and associated ground truths for a statistical prediction task.

Additionally, or alternatively, the training data 162 and/or model trainer 160 can include a machine-learned multitask search model. The machine-learned multitask search model can be utilized as described regarding machine-learned multitask search model 145 to generate one machine-learned multitask models (e.g., models 120 and 14θ). These model(s) can be sent by the training computing system 150 to the server computing system 130 and/or the user computing device 102. Alternatively, or additionally, the training computing system 150 can additionally train the generated machine-learned multitask model using the model trainer 160 and training data 162 as described previously before transmission to the server computing system 130 and/or the user computing device 102.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data (e.g. captured by a still or video camera; note that in variations the input may be other real-world data captured by another type of sensor). The machine-learned model(s) can process the image data to generate an output. As an example, the machine-learned model(s) can process the image data to generate an image classification output (e.g., a classification of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be audio compression task. The input may include audio data and the output may comprise compressed audio data. In another example, the input includes visual data (e.g. one or more image or videos), the output comprises compressed visual data, and the task is a visual data compression task. In another example, the task may comprise generating an embedding for input data (e.g. input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 1A illustrates one example computing system that can be used to implement the present disclosure. Other computing systems can be used as well. For example, in some implementations, the user computing device 102 can include the machine-learned multitask search model 145 and/or the model trainer 160 and the training dataset 162. In such implementations, the models 120 can be both trained and used locally at the user computing device 102. In some of such implementations, the user computing device 102 can implement the model trainer 160 and/or the machine-learned multitask search model 145 to personalize the models 120 based on user-specific data.

Figure 1B:
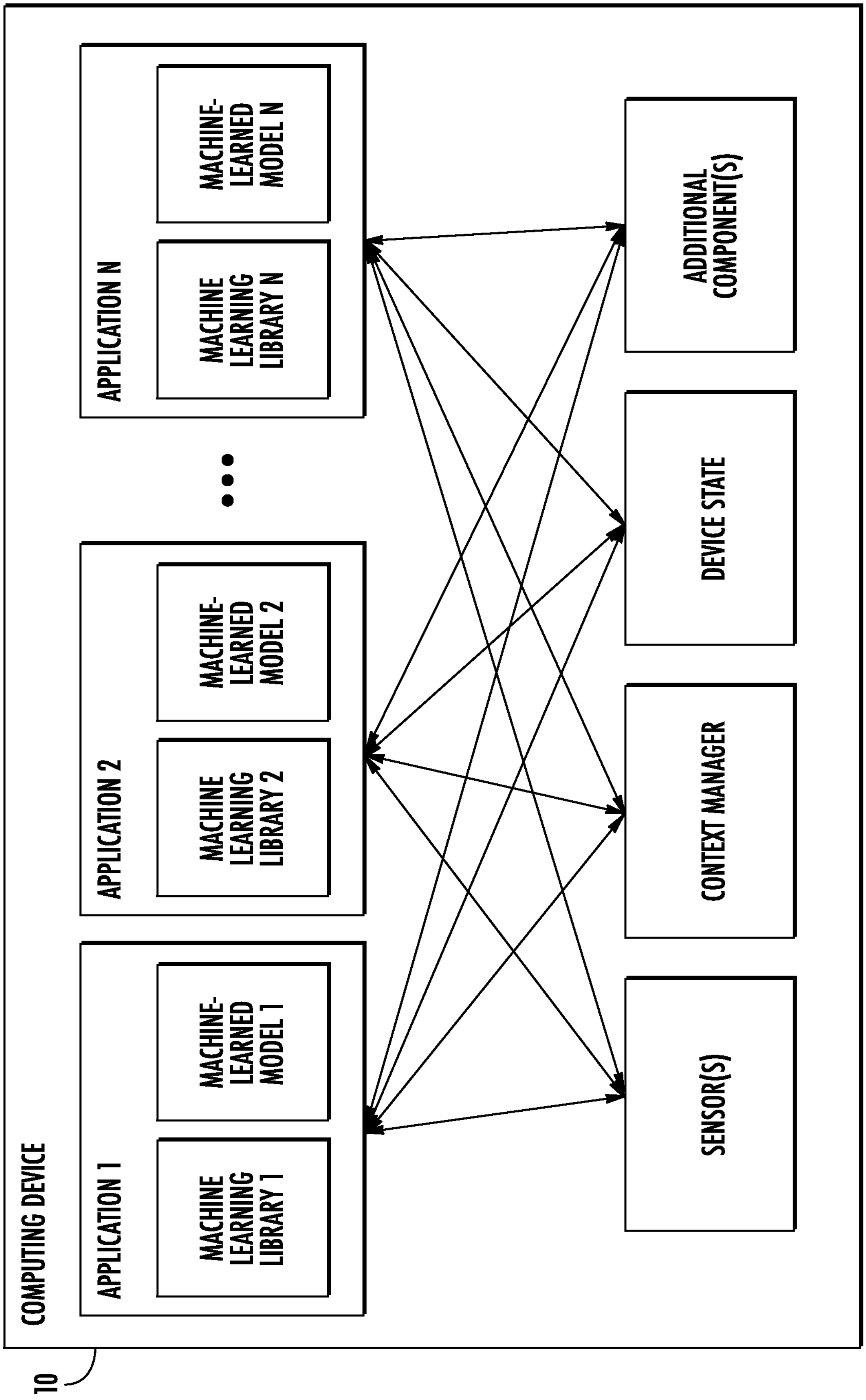
FIG. 1B depicts a block diagram of an example computing device that performs multiple tasks according to example embodiments of the present disclosure.

FIG. 1B depicts a block diagram of an example computing device 10 that performs multiple tasks according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
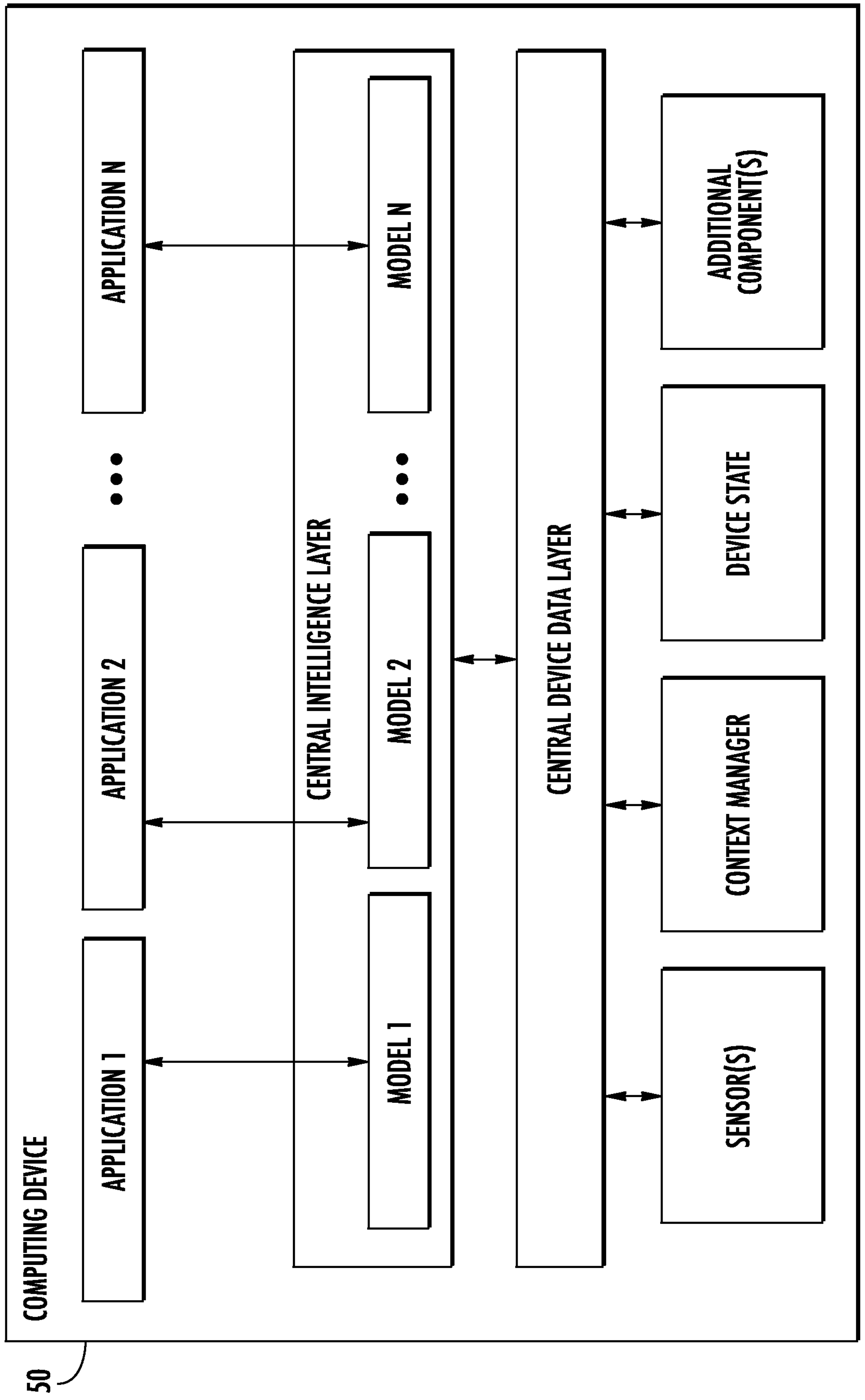
FIG. 1C depicts a block diagram of an example computing device that performs machine-learned multitask model generation according to example embodiments of the present disclosure.

FIG. 1C depicts a block diagram of an example computing device 50 that performs machine-learned multitask model generation according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a machine-learned multitask model) can be provided for each application using a machine-learned multitask search model and managed by the central intelligence layer. In other implementations, two or more applications can share a single machine-learned multitask model. For example, in some implementations, the central intelligence layer can provide a single model (e.g., a single machine-learned multitask model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
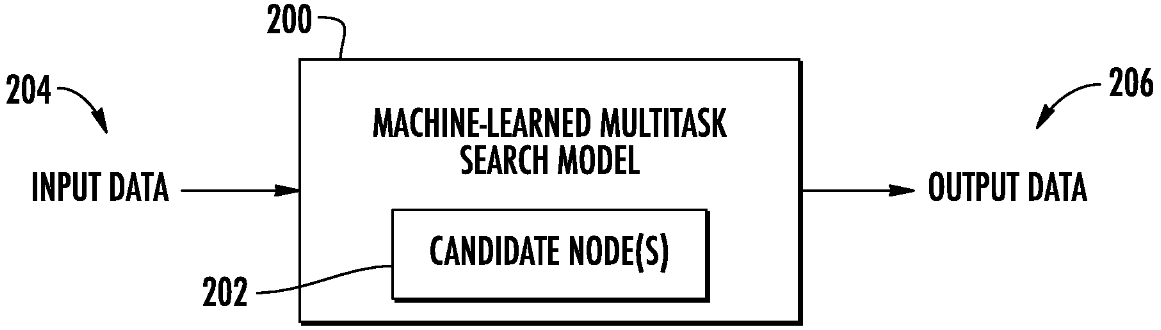
FIG. 2 depicts a block diagram of an example machine-learned multitask search model according to example embodiments of the present disclosure.

FIG. 2 depicts a block diagram of an example machine-learned multitask search model 200 according to example embodiments of the present disclosure. In some implementations, the machine-learned multitask search model 200 is trained to receive a set of input data 204 descriptive of a plurality of tasks and respectively associated task input data and, as a result of receipt of the input data 204, provide output data 206 descriptive of a plurality of task outputs respectively associated with the plurality of tasks described by input data 204. Thus, in some implementations, the machine-learned multitask search model 200 can include a plurality of candidate nodes 202 that are operable to generate task outputs based on task input data.

More particularly, the candidate nodes 202 can be selected for inclusion in a plurality of machine-learned task submodels by a respective plurality of routings. These routings can be generated by one or more associated machine-learned task controller models. As an example, a machine-learned task controller model can receive the input data 204. Based on a task described by the input data 204, the machine-learned task controller model can generate a routing that specifies a route "through" a selected subset of candidate nodes 202. This selected subset of candidate nodes can be the machine-learned task submodel that corresponds to the task of the input data 204. The machine-learned multitask search model 200 can process the input data 204 using the machine-learned task submodel specified by the routing to generate the output data 206. The specific implementation of machine-learned task controller models to generate routings that specify the inclusion of candidate nodes 202 in machine-learned task submodels will be discussed in greater detail with regards to FIG. 3.

The candidate nodes 202 can be or otherwise include one or more components of a neural network (e.g., an artificial neural network, a convolutional neural network, a recurrent neural network, etc.). As an example, a candidate node 202 can include a plurality of neural network neurons and/or functions structured as a layer (e.g., a convolutional layer, a pooling layer, etc.). As another example, the candidate node 202 can be or otherwise include a single neuron of a neural network. As yet another example, the candidate nodes 202 can be, perform, or otherwise include one or more machine-learned model functions (e.g., a normalization function such as a softmax function, a filtering function, a pooling function, etc.). In such fashion, each candidate node 202 can be or otherwise include any component(s), layer(s), and/or functionality(s) of a machine-learned model task/model.

Figure 3:
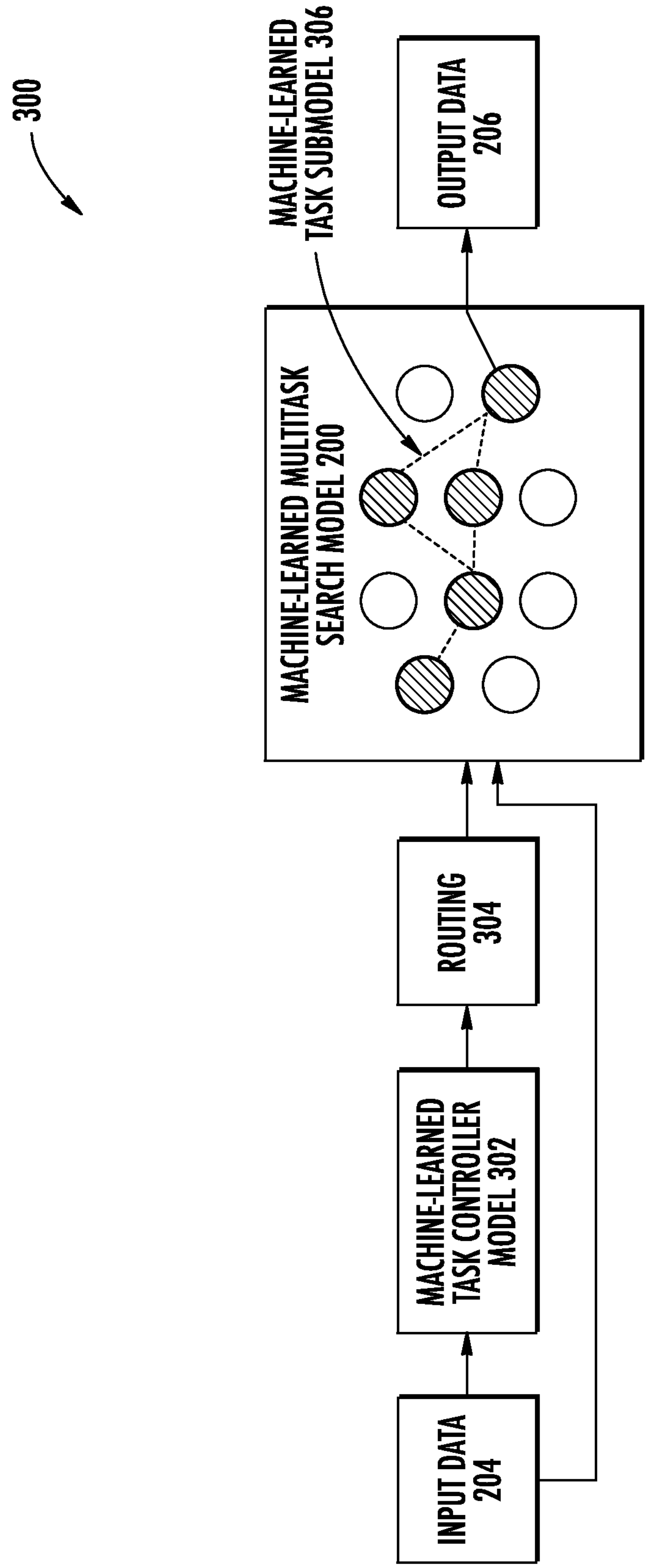
FIG. 3 depicts a block diagram of an example machine-learned multitask search model and corresponding machine-learned task submodel specified by a routing according to example embodiments of the present disclosure.

FIG. 3 depicts a block diagram 300 of an example machine-learned multitask search model 200 and corresponding machine-learned task submodel 306 specified by a routing 304 according to example embodiments of the present disclosure. The machine-learned multitask search model 200 can be the same model or a substantially similar model as the machine-learned multitask search model 200 of FIG. 2.

More particularly, the input data 204 can describe a plurality of tasks and associated task input data. A task can be or otherwise describe an expected processing operation(s) for a machine-learned model. More particularly, a task can describe an input data type and an expected output data type for a type of machine-learned model. As an example, a task can describe the input data 204 as image data and the expected output data 206 as image classification data. As another example, the task can describe the input data 204 as image data and the expected output data 206 as object recognition data that corresponds to one or more objects depicted in the image data. As yet another example, the task can describe the input data 204 as statistical data and the output data 206 as predictive data. As yet another example, the task can describe the input data 204 as an encoding and the output data 206 as a decoding or reconstruction of the encoding. As such, the plurality of tasks can include any tasks that are performed by task-specific machine-learned models. As an example, the tasks may include statistical prediction tasks, object recognition tasks, image classification tasks, semantic understanding tasks, or any other tasks.

For one task of the plurality of tasks, the machine-learned task controller model 302 that is associated with the task can be used to generate a candidate node routing 304 (e.g., a routing "through" the machine-learned multitask search model, etc.). The candidate node routing 304 can specify a subset of the plurality of candidate nodes (e.g., the candidate nodes 202 of FIG. 2) to be included in a machine-learned task submodel 306 that corresponds to the task of input data 204. As an example, a machine-learned task controller model 302 can generate a routing 304 for a task of the input data 204. The candidate node routing 304 can specify that a plurality of nodes of the machine-learned multitask search model 200 be included in a machine-learned task submodel 306. As an example, if the machine-learned multitask search model 200 includes a plurality of feed-forward layers, each comprising a respective plurality of nodes, the candidate node routing may be a selection of a single node in each of the layers, and the routing is a data flow path by which input data is fed successively forward through respective selected node of each of the layers. The task input data of the input data 204 can be input to the first "node" of the machine-learned task submodel 306 and can be processed by the machine-learned task submodel 306 according to the routing 304 generated by the machine-learned task model 302. The machine-learned task submodel 306 can process the input data 204 accordingly to generate the output data 206. The output data 206 can be or correspond to the type of output data specified by the task of the input data 204.

Each of the machine-learned task controller models 302 can be or can otherwise include one or more neural networks (e.g., deep neural networks) or the like. Neural networks (e.g., deep neural networks) can be feed-forward neural networks, convolutional neural networks, and/or various other types of neural networks.

It should be noted that the machine-learned task controller model 302 is depicted as a component separate from the machine-learned multitask search model 300 merely to more easily illustrate an example embodiment. Rather, in some implementations, the machine-learned task controller models 302 can be instantiated concurrently and/or simultaneously with the machine-learned multitask search model 300, and can be included together as an overarching machine-learned model ensemble.

Figure 4:
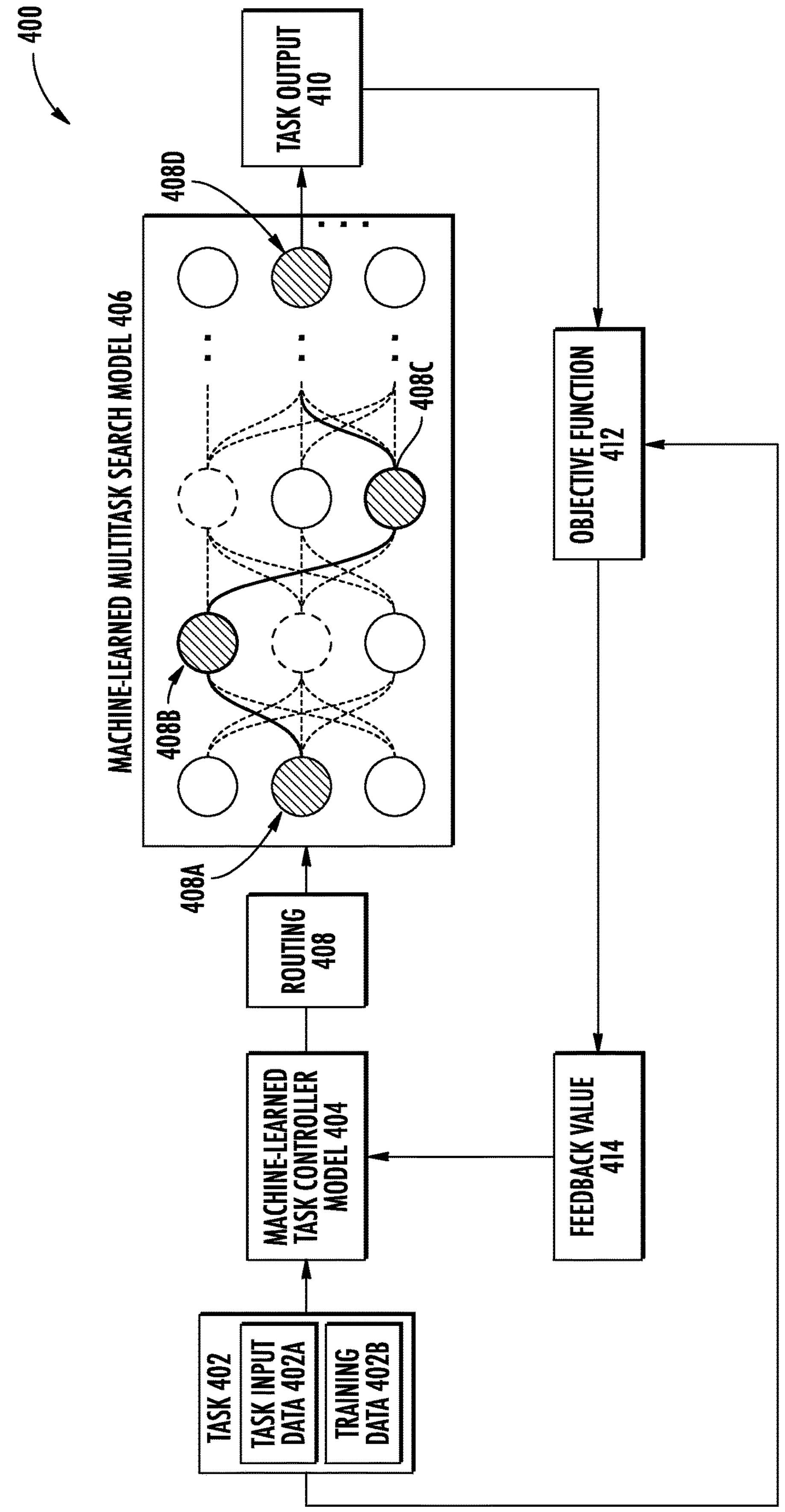
FIG. 4 depicts a data flow diagram for training a machine-learned task controller model of the according to example embodiments of the present disclosure.

FIG. 4 depicts a data flow diagram 400 for training a machine-learned task controller model 404 of the according to example embodiments of the present disclosure. A machine-learned task controller model 404 can receive task data 402. Task data 402 can include task input data 402A and training data 402B, and can further describe the expected operations associated with the task 402 and the expected input data type and output data type. Based on the operations and input/output data described by the task data 402, the machine-learned task controller model 404 can be used to generate a routing 408. The routing 408 can specify a subset of the plurality of candidate nodes (e.g., nodes 408A-D) from the machine-learned multitask search model 406 to be included in a machine-learned task submodel that corresponds to the task. As depicted, the routing 408 can specify that a first node 408A, a second node 408B, a third node 408C, and a fourth node 408D of the machine-learned multitask search model 406 are to be included in a machine-learned task submodel. More particularly, machine-learned task submodel can include the specified candidate nodes (e.g., 408A-408D), and can process the task input data 402A in the same manner as a conventional machine-learned model. In such fashion, the routing 408 generated by the machine-learned task controller model 404 can specify an order and number of nodes of the machine-learned multitask search model 406 to be included in a machine-learned task submodel that corresponds to task 402.

The task input data 402A can be input to the machine-learned task submodel (e.g., the candidate nodes 408A-408D specified by the routing 408) to generate a task output 410. As such, the task output 410 can correspond to the operations described by the task data 402. As an example, if the task data 402 describes and/or includes image data and an object recognition task, the task output 410 can be or otherwise include object recognition data. Based on objective function 412, the task output 410 can be used alongside a ground truth associated with the task input data 402A to generate a feedback value 414. The objective function 412 can be any type or form of loss function or objective function for training a machine-learned model (e.g., machine-learned task controller model 404. Similarly, the feedback value 414 can be any type or form of loss value or feedback value (e.g., training signal, etc.) for training a machine-learned model. As an example, the objective function 412 may be a reinforcement learning reward function, and the feedback value 414 can include or otherwise be a reward value (e.g., a reinforcement value, etc.) configured to facilitate a policy update to the machine-learned task controller model 404. Alternatively, the feedback value 414 can be a loss signal backpropagated through the machine-learned multitask search model 406 to the machine-learned task controller model 404. As such, any conventional loss or objective function 412 can be used to evaluate the task output 410 generated using the routing 408 determined by the machine-learned task controller model 404.

In some implementations, the task input data 402A can be validation data associated with the task 402 of the machine-learned task controller model 404, and the reward value 414 (e.g., the feedback value 414) can be a validation accuracy associated with the validation data. As an example, the objective function 412 can be a reinforcement learning reward function (e.g., a REINFORCE algorithm, etc.). The task input data 402A can be validation data associated with the task, and the feedback value can be a reward value 414 (e.g., reinforcement value, etc.) generated based on the task output data 410 and a ground truth associated with the task input data 402A.

One or more parameters of the machine-learned task controller model 404 can be adjusted based at least in part on the feedback value 414. More particularly, values of the parameters of the machine-learned task controller model 404 can be modified based on the feedback value 414. The parameter(s) of the machine-learned task controller model 404 can be adjusted using any conventional learning techniques or algorithms (e.g., backpropagation, gradient descent, reinforcement learning, etc.). As an example, the feedback value 414 can be a value generated by backpropagation of the objective function 412 through the machine-learned multitask search model 406 to reach the machine-learned task controller model 404. The one or more parameters of the machine-learned task controller model 404 can be adjusted based on this backpropagated feedback value 414 using any gradient descent technique (e.g., stochastic gradient descent, etc.).

As another example, the feedback value 414 can be a reward value 414 generated using a reinforcement learning reward function 412 (e.g., an objective function). The one or more parameters of the machine-learned task controller model 404 can be adjusted using reinforcement learning techniques. For example, the parameter(s) of the machine-learned task controller model 404 can be adjusted based on an evaluation of the reward value 414, a reinforcement baseline, a rate factor, a learning rate, a characteristic weight eligibility, etc. As such, any implementation of reinforcement learning and/or conventional machine-learning techniques can be used to both generate the feedback value 414 and to adjust the one or more parameters of the machine-learned task controller model 404.

Figure 5:
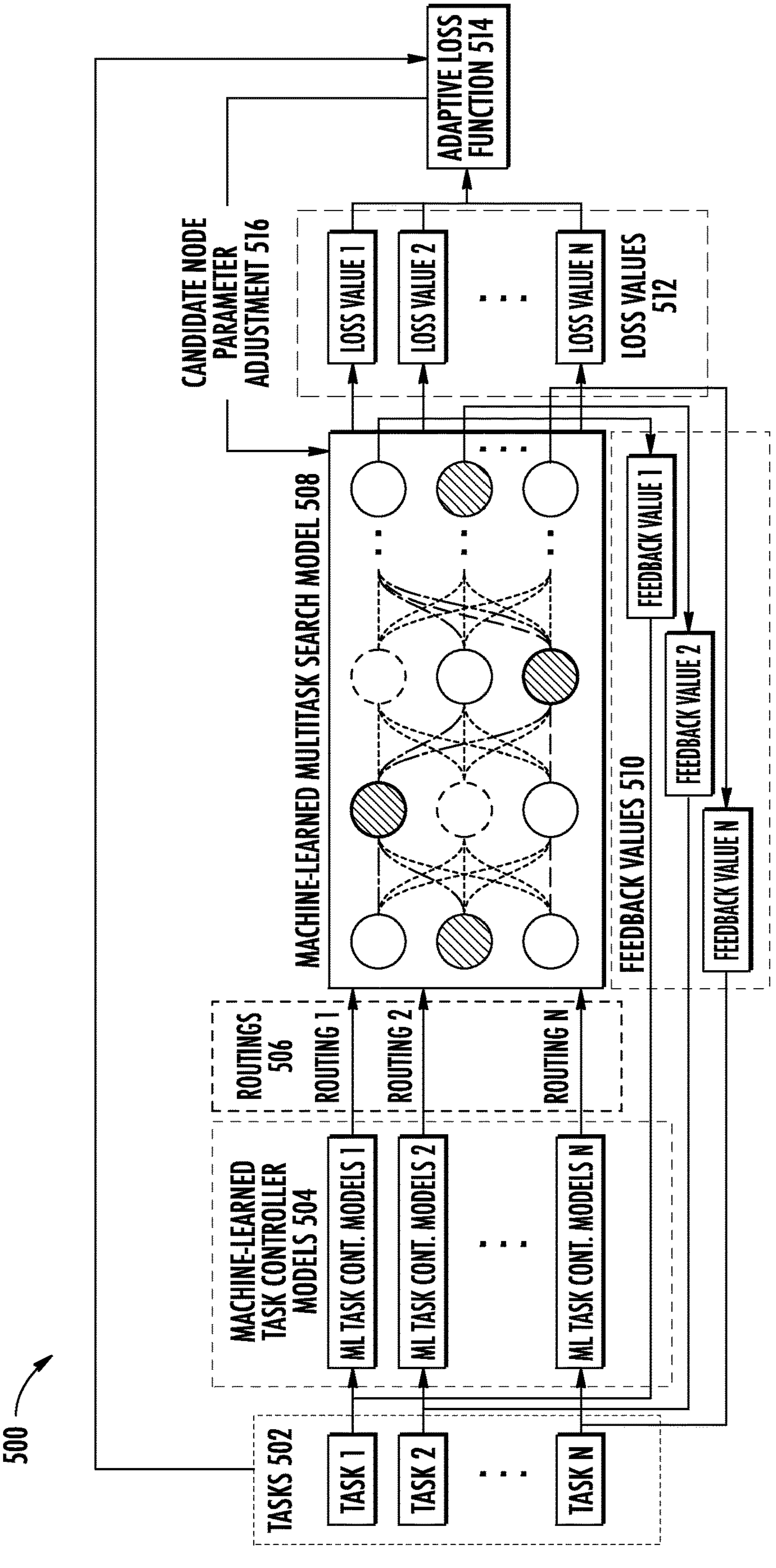
FIG. 5 depicts a data flow diagram for training one or more parameters of one or more candidate nodes of a machine-learned multitask search model according to example embodiments of the present disclosure.

FIG. 5 depicts a data flow diagram 500 for training one or more parameters of one or more candidate nodes of a machine-learned multitask search model according to example embodiments of the present disclosure. The tasks 502 can be received by their respective machine-learned task controller models 504, which are described previously with regards to FIG. 4. Similarly, the machine-learned task controller models 504 can generate routings 506 that specify a routing through a subset of the plurality of candidate nodes included in the machine-learned multitask search model 508 as described in FIG. 4. Task input data associated with the tasks 502 can be input to the machine-learned multitask search model 508 and can be processed according to the routings 506 generated by machine-learned task controller models 504 to generate feedback values 510. It should be noted that the machine-learned task controller models 504 are depicted as being respectively associated with an equal number of tasks 502 merely for illustration. Alternatively, in some implementations, one or more machine-learned task controller model(s) 504 could be utilized for the depicted number of tasks 502.

Further, training data associated with the tasks 502 can be input to the machine-learned multitask search model 508 and can be processed according to the routings 506 generated by machine-learned task controller models 504 to generate feedback values loss values 512. The training data can be any type of training data associated with the tasks 502. As an example, the training data can include image data for an object recognition task of tasks 502 and a ground truth that describes each object depicted in the image data. A task loss function can be used to generate loss values 512 based on the training output. The task loss function, and loss values 512 can each be generated using any conventional machine learning techniques. As an example, the task loss function can evaluate a difference between the training output and a ground truth associated with the training data to generate the loss values 512.

The loss values 512 can be evaluated using an adaptive loss function 514. More particularly, a candidate node parameter adjustment 516 based on the adaptive loss function 514 can be applied to the parameter(s) of the candidate node(s) of the machine-learned multitask search model 508 iteratively for each of the plurality of loss values 512. As an example, the loss values 512 can be stored in the order they were generated, and a computing system can sequentially backpropagate each of the losses 512 through the machine-learned multitask search model 508. Alongside backpropagation of each loss 512, the parameter(s) of the candidate node(s) of the machine-learned multitask search model 508 can be adjusted using candidate node parameter adjustment 516 (e.g., gradient descent, stochastic gradient descent, etc.). It should be noted that as the candidate node(s) of the machine-learned multitask search model 508 can be or otherwise include component(s) of conventional neural network(s), conventional machine-learning training techniques can be used to update the candidate node(s) and/or the components of the candidate node(s) based on the loss values.

The plurality of loss values 512 can be optimized through use of an adaptive loss function 514. An adaptive loss function 514 can be a function (e.g., loss function, optimization function, objective function, etc.), configured to adaptively adjust the parameter(s) of the candidate node(s) of the machine-learned multitask search model 508 based on the respective magnitudes of the plurality of loss values 512. As an example, the adaptive loss function 514 can adjust parameters adaptively based on the difficulty of the tasks 502. For example, a first task can be considered "harder" than a second task if the first task has a greater associated loss value 512. The adaptive loss function 514 can weigh the loss value associated with the first task more heavily than the loss value associated with the second task when adjusting the parameter(s) of the candidate node(s) of the machine-learned multitask search model 508. As such, the loss values 512 can, in some implementations, be "weighted" based at least in part on the magnitude of the loss value.

More particularly, the adaptive loss function 514 can, in some implementations, be leveraged to adaptively prioritize tasks 502 during the training phase and obtain balanced performance for all the tasks 502. This adaptive balanced task prioritization (ABTP) technique can introduce a transformed adaptive loss function 514 as shown in equation (1) below, where θ denotes the model parameters, $\mathcal{L}(T_i;\theta)$ denotes the loss of task $T_i$ with the current model parameters, r(θ) denotes the regularization:

$$\min_{\theta}\sum\nolimits_{i=1}^{N} h(\mathcal{L}(T_i;\theta)) + r(\theta) \tag{1}$$

In multitask learning scenarios, the loss of each task 502 can generally signal the task difficulty. The boosting function h(·) in equation (1) described above can be introduced to transform the loss subspace to a new subspace to boost the priorities of harder tasks. During candidate node parameter adjustment 516, $h'(\mathcal{L}(T_i;\theta))$ can be viewed as the current weight for task $T_i$. When h(·) is monotonically increasing, tasks with larger losses will be favored. The equation (1) described above can be described as adaptive in nature, as the equation can dynamically adjust task weights during the candidate node parameter adjustment 516. More particularly, each task 502 can respectively be assigned an associated task weight, and the adaptive loss function 514 can be configured to evaluate the task weight associated with the respective task 502.

Example Methods

Figure 6:
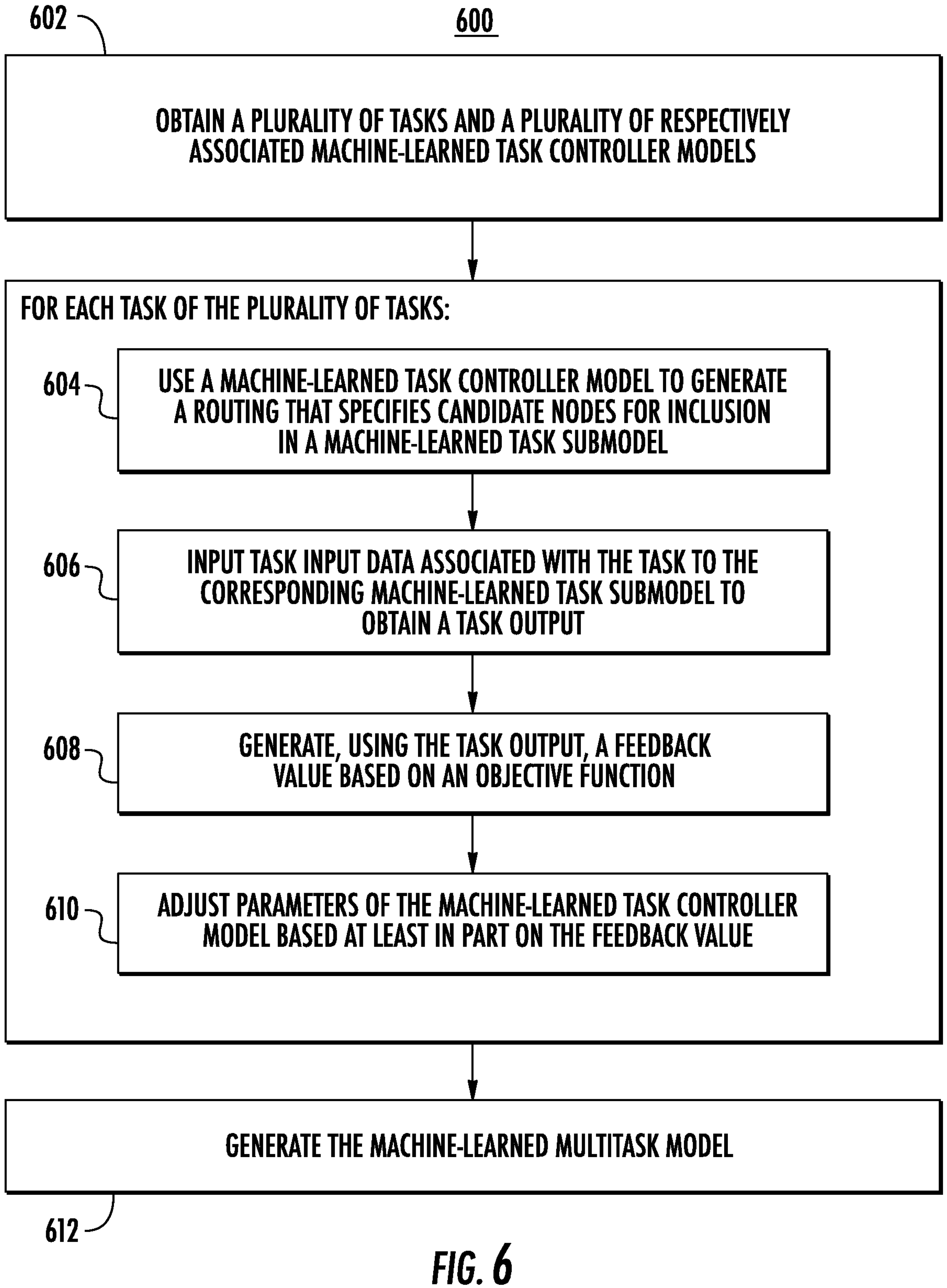
FIG. 6 depicts a flow chart diagram of an example method to perform generation of a machine-learned multitask model configured to perform a plurality of tasks according to example embodiments of the present disclosure.

FIG. 6 depicts a flow chart diagram of an example method to perform generation of a machine-learned multitask model configured to perform a plurality of tasks according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can obtain a plurality of tasks and a plurality of respectively associated machine-learned task controller models. More particularly, the computing system can obtain a machine-learned multitask search model that is configured to perform a plurality of tasks. The machine-learned multitask search model can include a plurality of candidate nodes. The candidate nodes can be or otherwise include one or more components of a neural network (e.g., an artificial neural network, a convolutional neural network, a recurrent neural network, etc.). As an example, a candidate node can include a plurality of neural network neurons and/or functions structured as a layer (e.g., a convolutional layer, a pooling layer, etc.). As another example, the candidate node can be or otherwise include a single neuron of a neural network. As yet another example, the candidate node can be, perform, or otherwise include one or more machine-learned model functions (e.g., a normalization function such as a softmax function, a filtering function, a pooling function, etc.). In such fashion, each candidate node can be or otherwise include any component(s), layer(s), and/or functionality(s) of a machine-learned model.

The computing system can obtain a plurality of tasks and a plurality of respectively associated machine-learned task controller models. A task can be or otherwise describe an expected processing operation for a machine-learned model. More particularly, a task can describe an input data type and an expected output data type for a type of machine-learned model. As an example, a task can describe the input data as image data and the expected output data as image classification data. As another example, the task can describe the input data as image data and the expected output data as object recognition data that corresponds to one or more objects depicted in the image data. As yet another example, the task can describe the input data as statistical data and the output as predictive data. As yet another example, the task can describe the input data as an encoding and the output data as a decoding or reconstruction of the encoding. As such, the plurality of tasks can include any tasks that are performed by task-specific machine-learned models. As an example, the tasks may include statistical prediction tasks, object recognition tasks, image classification tasks, semantic understanding tasks, or any other tasks.

At 604, the computing system can, for each task of the plurality of tasks, use a machine-learned task controller model to generate a routing that specifies candidate nodes for inclusion in a machine-learned task submodel. More particularly, the machine-learned task controller model that is associated with the task can be used to generate a routing (e.g., a routing "through" the machine-learned multitask search model, etc.). The routing can specify a subset of the plurality of candidate nodes to be included in a machine-learned task submodel that corresponds to the task. As an example, a machine-learned first task controller model can generate a routing for a first task. The routing can specify that a first node, a second node and a third node of the machine-learned multitask search model be included in a machine-learned first task submodel. A machine-learned second task controller model can generate a routing for a second task. The routing for the second task can specify the first node, a fourth node, and the third node of the machine-learned multitask search model be included in a machine-learned second task submodel. In such fashion, one or more machine-learned task controller models associated with the plurality of tasks can generate a task routing for each of the tasks.

As described previously, one or more machine-learned task controller models can be obtained for the plurality of tasks. As such, a machine-learned task controller model can, in some implementations, be trained to generate an optimal routing for a single task of the plurality of tasks. As an example, 15 separate tasks and 15 respectively associated machine-learned task controller models can be obtained by the computing system. Each of the 15 machine-learned task controller models can be configured to generate routings for a respectively associated task. Alternatively, in some implementations, a machine-learned task controller model can be obtained that is configured to generate routings for multiple tasks. As an example, a first machine-learned task controller model can be obtained that can be used to generate routings for a first task (e.g., an image classification task, etc.), a second task (e.g., an image classification task, etc.), and a third task (e.g., an object recognition task, etc.). Alternatively, or additionally, in some implementations, each of the machine-learned task controller models respectively associated with the plurality of tasks can be included in a machine-learned task controller model (e.g., as discrete submodels of a main machine-learned task controller model, etc.).

In some implementations, each of the one or more machine-learned task controller model(s) can be configured to generate routing(s) for tasks that are similar in nature (e.g., share a common input and/or output data type, etc.). As an example, a plurality of machine-learned task controller models can be obtained. A first machine-learned task controller model of the plurality can be configured to generate routings for a plurality of tasks that take image data as an input (e.g., object recognition task(s), image classification task(s), image semantic understanding task(s), etc.). A second machine-learned task controller model of the plurality can be configured to generate routings for a plurality of tasks that take statistical data as an input (e.g., trend analysis task(s), prediction task(s), etc.). In such fashion, the machine-learned task controller model(s) can be associated to task(s) based on one or more aspects of the task(s) (e.g., a input data type, an output data type, a complexity, a resource cost, a role in an associated task (e.g., a first and second task being steps in an overarching task, etc.), a learned association, etc.).

It should be noted that, in some implementations, each of the machine-learned task controller model(s) can be trained simultaneously during a "search" phase, allowing for optimization (e.g., evaluation, collation, normalization, etc.) of all the outputs (e.g., using an adaptive loss function, etc.) of the machine-learned task submodels generated using the machine-learned task controller models.

Each of the machine-learned task controller models can be or can otherwise include one or more neural networks (e.g., deep neural networks) or the like. Neural networks (e.g., deep neural networks) can be feed-forward neural networks, convolutional neural networks, and/or various other types of neural networks.

At 606, the computing system can, for each task of the plurality of tasks, input task input data associated with the task to the corresponding machine-learned task submodel to obtain a task output. More particularly, the computing system can input the task input data associated with the respective task into the corresponding machine-learned task submodel. The corresponding machine-learned task submodel (e.g., the selected candidate nodes of the machine-learned multitask search model, etc.) can process the task input data to obtain a task output. As described previously, the task output can correspond to the operations described by each task. As an example, if the task describes and/or includes image data and an object recognition task, the task output can be or otherwise include object recognition data.

At 608, the computing system can, for each task of the plurality of tasks, generate, using the task output, a feedback value based on an objective function. More particularly, the objective function can be any type or form of loss function or objective function for training a machine-learned model. Similarly, the feedback value can be any type or form of loss value or feedback value (e.g., training signal, etc.) for training a machine-learned model. As an example, the objective function may be a reinforcement learning reward function, and the feedback value can include or otherwise be a reward value (e.g., a reinforcement value, etc.) configured to facilitate a policy update to the machine-learned task controller model. Alternatively, the feedback value can be a loss signal backpropagated through the machine-learned multitask search model to the machine-learned task controller model(s). As such, any conventional loss or objective function can be used to evaluate the task output generated with the routing generated by the machine-learned task controller model.

In some implementations, the task input data can be validation data associated with the task of the machine-learned task controller model, and the reward value (e.g., the feedback value) can be a validation accuracy associated with the validation data. As an example, the objective function can be a reinforcement learning reward function (e.g., a REINFORCE algorithm, etc.). The task input data can be validation data associated with the task, and the feedback value can be a reward value (e.g., reinforcement value, etc.) generated based on the task output data.

At 610, the computing system can, for each task of the plurality of tasks, adjust parameters of the machine-learned task controller model based at least in part on the feedback value. More particularly, the computing system can adjust one or more parameters of the respectively associated machine-learned task controller model based at least in part on the feedback value. Values of the parameters of the machine-learned task controller model can be modified based on the feedback value. The parameter(s) of the machine-learned task controller model can be adjusted using any conventional learning techniques or algorithms (e.g., backpropagation, gradient descent, reinforcement learning, etc.). As an example, the feedback value can be a value generated by backpropagation of the objective function through the machine-learned multitask search model to reach the machine-learned task controller model. The one or more parameters of the machine-learned task controller model can be adjusted based on this backpropagated feedback value using any gradient descent technique (e.g., stochastic gradient descent, etc.).

As another example, the feedback value can be a reward value generated using a reinforcement learning reward function. The one or more parameters of the machine-learned task controller model can be adjusted using reinforcement learning techniques. For example, the parameter(s) of the machine-learned task controller model can be adjusted based on an evaluation of the reward value, a reinforcement baseline, a rate factor, a learning rate, a characteristic weight eligibility, etc. As such, any implementation of reinforcement learning and/or conventional machine-learning techniques can be used to both generate the feedback value and to adjust the one or more parameters of the machine-learned task controller model.

In some implementations, training data associated with the task can also be input to the machine-learned task submodel. The training data can be any type of training data associated with the task. As an example, the training data can include image data for an object recognition task and a ground truth that describes each object depicted in the image data. The computing system can use the machine-learned task submodel to process the training data and obtain a training output (e.g., an output described by the task). The computing system can use a task loss function to generate a loss value based on the training output. The task loss function, and loss value can each be generated using any conventional machine learning techniques. As an example, the task loss function can evaluate a difference between the training output and a ground truth associated with the training data to generate the loss value.

In some implementations, after generating a loss value for each task of the plurality of tasks, the computing system can adjust one or more parameters of candidate node(s) of the machine-learned multitask search model based on the plurality of loss values for the tasks. More particularly, the parameter(s) of the candidate node(s) can be updated iteratively for each of the plurality of loss values. As an example, the loss values can be stored in the order they were generated, and the computing system can sequentially backpropagate each of the losses through the machine-learned multitask search model. Alongside backpropagation of each loss, the computing system can adjust parameter(s) of the candidate node(s) using parameter adjustment techniques (e.g., gradient descent, stochastic gradient descent, etc.). It should be noted that as the candidate node(s) can be or otherwise include component(s) of conventional neural network(s), conventional machine-learning training techniques can be used to update the candidate node(s) and/or the components of the candidate node(s) based on the loss values.

More specifically, the machine-learned multitask search model can be used to search for optimal machine-learned task submodels (e.g., routes through the machine-learned multitask search model) over a number of iterations. Formally, the machine-learned multitask search model can utilize N tasks $T=\{T_1, T_2, \ldots, T_N\}$. At a "search" phase, the machine-learned multitask search model can utilize N machine-learned task controller models, $C=\{C_1, C_2, \ldots, C_N\}$, to manage the route selection for each task (e.g., to generate the machine-learned task submodels for each task, etc.).

Within one iteration, each of the machine-learned task controller models $C_i$ can respectively sample one route for each task $T_i$. Each sampled route can form a sampled machine-learned task submodel for task $T_i$ and each $C_i$ can receive a feedback value (e.g., a reward value, etc.) $R_i$ (e.g., a validation accuracy, etc.) from the model prediction. This $R_i$ can then be used to adjust parameters of the machine-learned task controller model $C_i$ (e.g., perform policy gradient update(s), etc.). The sampled machine-learned task submodels can then be trained on one batch of training data.

It should be noted that in some implementations, the machine-learned multitask search model can be utilized over a number of iterations to iteratively update the parameters of the machine-learned task controller models and/or the parameters of the machine-learned multitask search model itself, to effectively "search" for optimal machine-learned task submodels (e.g., routes) for each task. At a next iteration, each machine-learned task controller $C_i$ can generate a new machine-learned task submodel (e.g., resample an updated route with an updated policy, etc.). These iterations can be repeated until a maximum number of iteration epochs has been reached. As such, the workflow described above can, in some implementations, be described more formally as:

```
Result: Multiple Architecture Routes
  Initialize machine-learned task controller models (RL-Controllers);
  Initialize machine-learned multitask search model (super-network from search space);
  while Epochs<MaxEpochs do
    while i<TaskCount do
      Sample one route for Task [i] to form machine-learned task submodel;
      Run submodel on validation set to get Reward [i] (feedback value);
      Run model on training set to get TrainLoss [i] (loss value);
    end
    Perform update (REINFORCE) on machine-learned task controller models with Reward [i];
    Backprop TrainLoss [ ] to update model params in machine-learned multitask search model;
  end
```

However, it should be noted that the formalized representation described above is depicted merely to illustrate a single example of the present disclosure, and as such, the structure and/or process depicted is not necessarily required. More particularly, the operations described above can be performed in any alternative order or sequence. As an example, the operations described as the "Perform update (REINFORCE) on machine-learned task controller models with Reward [i]" step can, in some implementations, be performed iteratively in the "while" loop that iterates through each task of the plurality of tasks.

Alternatively, in some implementations, the plurality of loss values can be optimized through use of an optimizer. An optimizer can be a function (e.g., loss function, optimization function, objective function, etc.), configured to adaptively adjust the parameter(s) of the candidate node(s) of the machine-learned multitask search model based on the respective magnitudes of the plurality of loss values. As an example, the optimizer can be an adaptive loss function that adjusts parameters adaptively based on the difficulty of a task. For example, a first task can be considered "harder" than a second task if the first task has a greater associated loss value. The adaptive loss function can weigh the loss value associated with the first task more heavily than the loss value associated with the second task when adjusting the parameter(s) of the candidate node(s). As such, the loss values can, in some implementations, be "weighted" based at least in part on the magnitude of the loss value.

More particularly, the loss function can, in some implementations, be leveraged to adaptively prioritize tasks during the "training" phase and obtain balanced performance for all the tasks. This adaptive balanced task prioritization (ABTP) technique can introduce a transformed loss objective function as shown in equation (1) below, where $\theta$ denotes the model parameters, $\mathcal{L}(T_i;\theta)$ denotes the loss of task $T_i$ with the current model parameters, $r(\theta)$ denotes the regularization:

$$\min_{\theta} \sum_{i=1}^{N} h(\mathcal{L}(T_i;\theta)) + r(\theta) \tag{1}$$

In multitask learning scenarios, the loss of each task can generally signal the task difficulty. The boosting function $h(\cdot)$ in equation (1) described above can be introduced to transform the loss subspace to a new subspace to boost the priorities of harder tasks. During gradient update, $h'(\mathcal{L}(T_i;\theta))$ can be viewed as the current weight for task $T_i$. When $h(\cdot)$ is monotonically increasing, tasks with larger losses will be favored. The equation (1) described above can be described as adaptive in nature, as the equation can dynamically adjust task weights during the entire training phase. More particularly, each task can respectively be assigned an associated task weight, and the objective function and/or the loss function can be configured to evaluate the task weight associated with the respective task.

If a linear function is utilized as $h(\cdot)$, the objective function can be regressed to a scaled sum of the task losses which generally cannot achieve desired task prioritization, as $h'(\cdot)$ is constant. As such, it should be noted that multiple options for the boosting function $h(\cdot)$ can be utilized, including but not limited to linear, polynomial, and exponential functions. As an example, some functions (e.g., polynomial functions, exponential functions, etc.) can be utilized to amplify the adjustments generated based on the loss value(s), therefore facilitating the optimizer to favor the "harder" task over the "easier" task. As another example, nonlinear boosting function(s) and/or exponential boosting function(s) can be utilized to increase model performance by facilitating operation of the optimizer.

In some implementations, the joint loss function (e.g., the loss function) can be made adjustable during search and training iterations (e.g., adjustment of parameters of the machine-learned task controller model(s) and the machine-learned multitask search model) by introducing a task prioritization coefficient in the boosting function. More particularly, an exponential function can be used as a boosting function, and an adaptive boosting function (e.g., the loss function) can be defined as:

$$h = \exp\left(\frac{\mathcal{L}(T_i; \theta)}{w}\right) \quad (2)$$

As described in equation (2), the adaptive coefficient w can be put on a decay schedule throughout the training phase (e.g. linear decay from $w_{max}$ to $w_{min}$). As w decreases, tasks with larger loss can become increasingly more important. As such, the machine-learned multitask search model can favor difficult tasks more at the later part of the search/training phase for eventual inclusion in a machine-learned multitask model. It should be noted that in some implementations, either a decreasing schedule of w, a constant schedule of w, or an increasing schedule of w. However, in some implementations, utilization of a decreasing schedule of w can lead to more efficient performance with the machine-learned multitask search model.

Alternatively, in some implementations, the task input data can include the training data. Similarly, the task output of the machine-learned task submodel can include the training output. More particularly, the task output can be utilized as both a training output and a task output to respectively generate the loss value and the feedback value by the computing system. In such fashion, the computing system can input a single dataset to the machine-learned task submodel (e.g., a training set, a validation set, a combination of both sets, etc.) to receive an output configured to provide both a feedback value and a loss value.

At 612, the computing system can generate the machine-learned multitask model. More particularly, the computing system can utilize the nodes specified for inclusion in the machine-learned task controller submodels for each task to generate the machine-learned multitask model. As such, the machine-learned multitask model can include at least one subset of the plurality of subsets of candidate nodes specified for inclusion in at least one respective machine-learned task submodel. As an example, the machine-learned multitask search model can perform a number of searching iterations in accordance with a number of machine-learned task controller models. For example, three machine-learned task controller models for three respective tasks can iteratively optimize a routing (e.g., specified candidate nodes for inclusion in a machine-learned task submodel, etc.) for each of the three tasks. After the final search epoch, the computing system can utilize at least one of the three candidate node subsets (e.g., the three machine-learned task submodels, etc.) to generate the machine-learned multitask model. As an example, the computing system may select two machine-learned task submodels and their corresponding candidate node(s) for inclusion in the machine-learned multitask model. As another example, the computing system may select each of the plurality of machine-learned task submodels and their respective candidate node(s) for inclusion in the machine-learned multitask model.

It should be noted that the generation of the machine-learned multitask model can also include the route specified between the candidate nodes. As an example, if a machine-learned multitask model is generated with the candidate nodes specified by a first machine-learned task submodel, the machine-learned multitask model can retain the specified route through the candidate nodes of the machine-learned task submodel, and any parameters associated with these nodes. In such fashion, the machine-learned multitask search model can be utilized alongside the machine-learned task controller models to find an optimal machine-learned task submodel for each task, and the machine-learned multitask model can be generated by selecting the nodes and routes discovered through utilization of the machine-learned multitask search model.

More specifically, in some implementations, at the end of the search phase, the most "likely routes" (e.g., the optimal machine-learned task submodels) can be taken from each machine-learned task controller model to form a single machine-learned multitask model (e.g., a joint model) with all task routes and specified candidate nodes. As described previously, the machine-learned task submodel for one task can be built with the nodes routed by a route generated by the machine-learned task controller models. As such, in the machine-learned multitask model (e.g., the joint model), each task can run through its own route as specified by its optimized machine-learned task submodel.

It should be noted that in some implementations, if more than one task is routed to the same node in the machine-learned multitask model, the weights (e.g., parameter values, etc.) in/of that shared node can be used by all tasks that share the node. If only one task is routed to a node, the node will be exclusively used by that task.

In some implementations, candidate nodes of the machine-learned multitask search model that were not used by any task (e.g., were not included in any machine-learned task submodel by the machine-learned task controller models) can remain unselected for inclusion in the machine-learned multitask model. As such, the machine-learned multitask model can include a subset of the total candidate nodes that constitute the machine-learned multitask search model. In some implementations, for a node of the machine-learned multitask model (e.g., a conv node, etc.), each task can selectively use a subset of filters. The filter number can also be selected by the machine-learned task controller model for the task.

In some implementations, the machine-learned multitask model can subsequently be trained. In training, each task can train the nodes included in the tasks route. In such fashion, the sharing of nodes between task routes can reduce the number of parameters in the machine-learned multitask model. Additionally, the sharing of nodes can facilitate positive knowledge transfer among tasks. More particularly, multitask training data associated with one of the machine-learned task submodels can be input to the machine-learned multitask model to obtain a multitask training output. One or more parameters of the machine-learned multitask model can be adjusted based on the multitask training output (e.g., based on a loss function, etc.). In such fashion, additional training iterations can be utilized to further optimize the machine-learned multitask model.

As such, a node can be favored by multiple tasks when its parameters are beneficial for each of them. Given that each machine-learned task controller model can independently select the route through candidate nodes based on the feedback value (e.g., the task accuracy reward), the route similarity can also manifest more strongly when tasks are strongly correlated (e.g., image classification and object classification, etc.).

The machine-learned multitask model can be utilized to generate multiple outputs for multiple corresponding tasks. More particularly, a computing system can include the machine-learned multitask model. The machine-learned multitask model can be generated at the computing system (e.g., using the machine-learned multitask search model, etc.) or received from a second computing system (e.g., that has used the machine-learned multitask search model, etc.). The computing system can obtain first task input data associated with a first task and second task input data associated with a second task. The tasks can be any tasks performed by a task-specific machine-learned model. As an example, the tasks can respectively be an image classification task an and object recognition task. The task input data can be associated with the respective tasks. As an example, the first task input data and the second task input data can both respectively include image data. As such, in some implementations, the first task and the second task can share the same input data and output different task output data (e.g., image classification data and object recognition data, etc.). Alternatively, in some implementations, the first task input data can be statistical prediction data and the second task data can be image data. As such, the first task and second task do not necessarily need to be similar tasks.

The computing system can input the first task input data to the machine-learned multitask model to obtain a first task output that corresponds to the first task. The computing system can input the second task input data to the machine-learned multitask model to obtain a second task output that corresponds to the second task. In such fashion, the machine-learned multitask model can be trained and utilized to perform a variety of tasks, regardless of the similarity of the tasks.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for generating a machine-learned multitask model configured to perform a plurality of tasks, the method comprising:

obtaining, by one or more computing devices, a machine-learned multitask search model comprising a plurality of candidate nodes;

obtaining, by the one or more computing devices, the plurality of tasks and one or more machine-learned task controller models associated with the plurality of tasks;

for each task of the plurality of tasks:

using, by the one or more computing devices, the machine-learned task controller model respectively associated with the task to generate a routing that specifies a subset of the plurality of candidate nodes of the machine-learned multitask search model for inclusion in a machine-learned task submodel for the corresponding task;

inputting, by the one or more computing devices, task input data associated with the task to the corresponding machine-learned task submodel to obtain a task output;

generating, by the one or more computing devices using the task output, both a respective feedback value based on an objective function and a respective loss value;

adjusting, by the one or more computing devices, one or more parameters of the respectively associated machine-learned task controller model based at least in part on the respective feedback values; and adjusting, by the one or more computing devices, one or more parameters of the machine-learned multi-task search model using an adaptive loss function which is evaluated based on the respective loss values.

2. The computer-implemented method of claim 1, wherein the method further comprises generating, by the one or more computing devices, the machine-learned multitask model, wherein the machine-learned multitask model comprises a combination of at least a subset of machine-learned task submodels of the plurality of machine-learned task submodels.

3. The computer-implemented method of claim 2, wherein the method further comprises:

inputting, by the one or more computing devices, multitask training data associated with a machine-learned task submodel of the at least the subset of machine-learned task submodels to the machine-learned multitask model to obtain a multitask training output; and adjusting, by the one or more computing devices, one or more parameters of the machine-learned multitask model based at least in part on the multitask training output.

4. The computer-implemented method of claim 1, wherein:

the feedback value comprises a reward value; and the objective function comprises a reinforcement learning reward function.

5. The computer-implemented method of claim 1, wherein adjusting, by the one or more computing devices, the one or more parameters of the respectively associated machine-learned task controller model based at least in part on the feedback value comprises backpropagating the objective function through the corresponding machine-learned task submodel to reach the respectively associated machine-learned task controller model.

6. The computer-implemented method of claim 1, wherein:

for each task of the plurality of tasks:

inputting, by the one or more computing devices, the task input data associated with the task to the corresponding machine-learned task submodel to obtain the task output further comprises inputting, by the one or more computing devices, training data associated with the task to the corresponding machine-learned task submodel to obtain a training output;

generating, by the one or more computing devices using the task output, the feedback value based on the objective function further comprises generating, by the one or more computing devices using the training output, a loss value based on a task loss function; and the method further comprises adjusting, by the one or more computing devices, the one or more parameters of at least one candidate node of the machine-learned multitask search model based on a plurality of loss values respectively associated with the plurality of tasks.

7. The computer-implemented method of claim 6, wherein:

the task input data comprises the training data; and the task output comprises the training output.

8. The computer-implemented method of claim 6, wherein the task input data comprises image data, and the task output comprises at least one of:

image classification data;

image recognition data;

object recognition data corresponding to one or more objects depicted in the image data; and object segmentation data.

9. The computer-implemented method of claim 6, wherein:

a respective task weight is associated with each task of the plurality of tasks; and at least the objective function is configured to evaluate the task weight associated with the respective task.

10. The computer-implemented method of claim 6, wherein:

a first loss value of the plurality of loss values is greater than a second loss value of the plurality of loss values; and the one or more parameters of the at least one candidate node are adjusted based on the plurality of loss values and the adaptive loss function, wherein the adaptive loss function is configured to evaluate at least the difference between the first loss value and the second loss value.

11. The computer-implemented method of claim 1, wherein:

the one or more machine-learned task controller models comprise a plurality of task controller models respectively associated with the plurality of tasks;

a first machine-learned task controller model associated with a first task is used to generate a first routing that specifies a first subset of the plurality of the candidate nodes;

a second machine-learned task controller model associated with a second task is used to generate a second routing that specifies a second subset of the plurality of the candidate nodes; and the first subset of the plurality of candidate nodes and the second subset of the plurality of candidate nodes contain at least one shared candidate node.

12. The computer-implemented method of claim 1, wherein at least one of the plurality of tasks comprises:

an image generation task;

a sound signal description task, wherein the task output of the sound signal description task comprises data describing a sound signal;

a text translation task, wherein the task output of the text translation task comprises a translation of text in a first natural language to a second natural language; or a control data generation task, wherein the task output of the control data generation task comprises control data for controlling an agent which operates in a real-world environment.

13. A computing system, comprising:

a machine-learned multitask model configured to generate a plurality of outputs for a respectively associated plurality of tasks, wherein the machine-learned multitask model comprises a plurality of candidate nodes, wherein each node of the plurality of candidate nodes is included in the machine-learned multitask model based at least in part on their inclusion in one or more of a plurality of machine-learned task submodels respectively associated with the plurality of tasks;

one or more tangible, non-transitory computer readable media storing computer-readable instructions that when executed by the one or more processors cause the one or more processors to perform operations, the operations comprising:

obtaining the plurality of tasks and one or more machine-learned task controller models associated with the plurality of tasks;

for each task of the plurality of tasks:

using the machine-learned task controller model respectively associated with the task to generate a routing that specifies a subset of the plurality of candidate nodes of the machine-learned multitask search model for inclusion in a machine-learned task submodel for the corresponding task;

inputting task input data associated with the task to the corresponding machine-learned task submodel to obtain a task output;

generating, using the task output, both a respective feedback value based on an objective function and a respective loss value; and adjusting one or more parameters of the respectively associated machine-learned task controller model based at least in part on the respective feedback values; and adjusting one or more parameters of the machine-learned multi-task search model using an adaptive loss function which is evaluated based on the respective loss values.

14. The computing system of claim 13, wherein:

the first task input data and the second task input data comprises image data;

the first task output comprises image classification data; and the second task output comprises object recognition data corresponding to one or more objects depicted in the image data.

15. The computing system of claim 13, wherein:

the machine-learned multitask model comprises one or more neural networks; and each of the plurality of nodes comprises at least one of:

one or more neurons; or one or more functions.

16. One or more tangible, non-transitory computer readable media storing computer-readable instructions that when executed by one or more processors cause the one or more processors to perform operations, the operations comprising:

obtaining a machine-learned multitask model configured to generate a plurality of outputs for a respectively associated plurality of tasks, wherein the machine-learned multitask model comprises a plurality of candidate nodes, wherein each node of the plurality of nodes is included in the machine-learned multitask model based at least in part on their inclusion in one or more of a plurality of machine-learned task submodels respectively associated with the plurality of tasks;

obtaining the plurality of tasks and one or more machine-learned task controller models associated with the plurality of tasks;

for each task of the plurality of tasks:

using the machine-learned task controller model respectively associated with the task to generate a routing that specifies a subset of the plurality of candidate nodes of the machine-learned multitask search model for inclusion in a machine-learned task submodel for the corresponding task;

inputting task input data associated with the task to the corresponding machine-learned task submodel to obtain a task output;

generating, using the task output, both a respective feedback value based on an objective function and a respective loss value; and adjusting one or more parameters of the respectively associated machine-learned task controller model based at least in part on the respective feedback values; and adjusting one or more parameters of the machine-learned multi-task search model using an adaptive loss function which is evaluated based on the respective loss values.

17. The one or more tangible, non-transitory computer readable media of claim 16, wherein:

the first task input data and the second task input data comprises image data;

the first task output comprises image classification data; and the second task output comprises object recognition data corresponding to one or more objects depicted in the image data; and wherein each node of the plurality of nodes of the machine-learned multitask model is selected for inclusion in the one or more of the plurality of machine-learned task submodels by one or more associated machine-learned task controller models.

* * * * *